(12) United States Patent
Endal et al.

(10) Patent No.: US 10,627,011 B2
(45) Date of Patent: Apr. 21, 2020

(54) TIE IN OF PIPELINE TO SUBSEA STRUCTURE

(71) Applicant: EQUINOR ENERGY AS, Stavanger (NO)

(72) Inventors: Geir Endal, Jessheim (NO); Kjell Einar Ellingsen, Tananger (NO)

(73) Assignee: EQUINOR ENERGY AS, Stavanger (NO)

( * ) Notice: Subject to any disclaimer, the term of this patent is extended or adjusted under 35 U.S.C. 154(b) by 0 days.

(21) Appl. No.: 16/092,568

(22) PCT Filed: Apr. 11, 2017

(86) PCT No.: PCT/NO2017/050091
§ 371 (c)(1),
(2) Date: Oct. 10, 2018

(87) PCT Pub. No.: WO2017/179993
PCT Pub. Date: Oct. 19, 2017

(65) Prior Publication Data
US 2019/0137005 A1    May 9, 2019

(30) Foreign Application Priority Data
Apr. 11, 2016  (GB) .................................. 1606130.1

(51) Int. Cl.
*F16L 1/24* (2006.01)
*E21B 43/01* (2006.01)
(Continued)

(52) U.S. Cl.
CPC .............. *F16L 1/26* (2013.01); *E21B 43/013* (2013.01); *E21B 43/0107* (2013.01); *F16L 1/16* (2013.01); *F16L 1/163* (2013.01)

(58) Field of Classification Search
CPC ........ F16L 1/26; F16L 1/16; F16L 1/24; E21B 43/013; E21B 43/0107; E21B 43/0135
See application file for complete search history.

(56) References Cited

U.S. PATENT DOCUMENTS 3,308,881 A * 3/1967 Chan .................... E21B 43/0135
166/340
3,352,119 A * 11/1967 Manning ................. E21B 43/36
405/225

(Continued)

FOREIGN PATENT DOCUMENTS

EP    0 624 712    11/1994
GB    2 477 780    8/2011

(Continued)

OTHER PUBLICATIONS

International Search Report and Written Opinion of the International Searching Authority dated Jun. 26, 2017 in International (PCT) Application No. PCT/NO2017/050091.

(Continued)

*Primary Examiner* — Benjamin F Fiorello
*Assistant Examiner* — Edwin J Toledo-Duran
(74) *Attorney, Agent, or Firm* — Wenderoth, Lind & Ponack, L.L.P.

(57) ABSTRACT

A subsea structure includes a support in the form of a foundation or a supporting structure mounted to a foundation. A method for installing a pipeline includes: providing the support with a pull-in point at a proximal location at a first side of the support; providing the support with a strong point at a distal location, which is spaced apart from the proximal location, there being a straight clear path between the pull-in point and the strong point bridging some of or all of a width of the support; passing a pull down wire through a guide at the strong point and using the pull down wire to pull in the pipeline; laying down the pipeline and passing the (Continued)

pull down wire along the clear path; and continuing the laying down and/or pulling in until a tie-in head of the pipeline is at a required location at the pull-in point.

28 Claims, 8 Drawing Sheets

(51) Int. Cl.
    *F16L 1/26*         (2006.01)
    *E21B 43/013*     (2006.01)
    *F16L 1/16*         (2006.01)

(56) References Cited

U.S. PATENT DOCUMENTS

| | | | | |
|---|---|---|---|---|
| 3,378,066 A * | 4/1968 | Otteman | E21B 43/0135 | 166/346 |
| 3,391,734 A * | 7/1968 | Townsend, Jr. | B63C 11/36 | 166/356 |
| 3,604,731 A * | 9/1971 | Petersen | E21B 41/10 | 285/29 |
| 3,716,100 A * | 2/1973 | Nelson | E21B 43/0135 | 166/343 |
| 3,721,294 A * | 3/1973 | Nelson | E21B 43/0135 | 166/342 |
| 3,724,224 A * | 4/1973 | Matthews, Jr. | E21B 43/0107 | 138/113 |
| 3,775,986 A * | 12/1973 | Daughtry | E21B 43/0135 | 405/169 |
| 3,845,973 A * | 11/1974 | Houot | E21B 43/0135 | 285/26 |
| 3,846,992 A * | 11/1974 | Liautaud | B63B 35/06 | 405/169 |
| 3,973,625 A * | 8/1976 | Baugh | E21B 43/0135 | 166/343 |
| 3,982,776 A * | 9/1976 | Payne | F16L 37/002 | 285/24 |
| 4,023,619 A * | 5/1977 | Marquaire | E21B 41/06 | 166/341 |
| 4,068,491 A * | 1/1978 | Nobileau | B23K 9/0061 | 166/343 |
| 4,133,182 A * | 1/1979 | Chateau | F16L 37/002 | 405/169 |
| 4,161,367 A * | 7/1979 | Cuiper | E21B 43/0135 | 405/169 |
| 4,175,620 A * | 11/1979 | Nolan, Jr. | E21B 43/0135 | 166/343 |
| 4,186,135 A * | 1/1980 | Thominet | C07D 405/12 | 424/657 |
| 4,225,270 A * | 9/1980 | Dareing | E21B 43/0135 | 166/346 |
| 4,279,542 A * | 7/1981 | Lewis, Jr. | E21B 43/0107 | 166/347 |
| 4,472,080 A * | 9/1984 | Lawson | E21B 43/0135 | 405/169 |
| 4,472,081 A * | 9/1984 | Lawson | E21B 43/0135 | 405/169 |
| 4,568,221 A * | 2/1986 | Lerique | E21B 43/0135 | 166/343 |
| 4,570,716 A * | 2/1986 | Genini | E21B 17/015 | 166/346 |
| 4,591,292 A * | 5/1986 | Stevens | F16L 37/002 | 166/341 |
| 4,661,016 A * | 4/1987 | Baugh | E21B 33/038 | 405/169 |
| 5,437,518 A * | 8/1995 | Maloberti | E21B 17/017 | 405/169 |
| 6,371,693 B1 * | 4/2002 | Kopp | F16L 53/37 | 405/158 |
| 7,874,372 B2 * | 1/2011 | Varkey | E21B 47/0006 | 166/384 |
| 7,992,633 B2 * | 8/2011 | Donald | E21B 33/068 | 166/75.12 |
| 8,066,063 B2 * | 11/2011 | Donald | C22B 3/02 | 166/88.4 |
| 8,066,076 B2 * | 11/2011 | Donald | E21B 33/035 | 166/344 |
| 8,104,541 B2 * | 1/2012 | Donald | E21B 33/035 | 166/342 |
| 8,297,360 B2 * | 10/2012 | Donald | E21B 33/035 | 166/364 |
| 8,485,267 B2 * | 7/2013 | Nguyen | E21B 33/038 | 166/338 |
| 8,573,305 B2 * | 11/2013 | Reddy | E21B 17/017 | 166/338 |
| 9,938,791 B2 * | 4/2018 | Phythian | E21B 33/03 | |
| 10,364,916 B2 * | 7/2019 | Moen | F16L 1/26 | |
| 2010/0040417 A1 * | 2/2010 | Bursaux | B63B 35/03 | 405/166 |
| 2012/0003048 A1 * | 1/2012 | Hosoy | B63B 21/27 | 405/172 |

FOREIGN PATENT DOCUMENTS

WO       02/057674       7/2002
WO     2015/149843     10/2015

OTHER PUBLICATIONS

United Kingdom Search Report dated Sep. 26, 2016 in GB Application No. 1606130.1.

* cited by examiner

TIE IN OF PIPELINE TO SUBSEA STRUCTURE

The invention relates to a method and an apparatus for tie in of a pipeline to a subsea structure, in particular to the tie in of pipelines used in the oil and gas industry.

Pipelines for an oil and gas installation, such as those used for the transport of hydrocarbons, e.g. oil or gas, are typically laid along the seabed using a laying vessel. Such subsea pipelines can be installed between, for example, two subsea structures, where the subsea structures may be "Christmas trees", riser bases, Blow-Out Preventers (BOPs), or some other structures. Often one or both ends of the pipeline are connected (or "tied-in") to a subsea structure using a separate jumper or spool. The extra components and procedures associated with the use of separate jumpers or spools can result in high costs for the installation process. Direct tie-in methods can also be used and are often preferable. These methods include:

- direct pull-in, in which an end of the pipeline is pulled close to the subsea structure using a winch location on the laying vessel, and the tie-in is completed using a remotely operated vehicle (ROV) and alignment apparatus;
- deflect to connect, wherein the pipe is pulled to a target area in line with the platform but to one side of it, then the connection is made by winding or otherwise deflecting the pipe laterally until it mates with the riser connection; and
- connect and lay-away, in which the subsea end of the pipeline is connected to the subsea structure at the surface, and the subsea structure is then lowered to the seabed before the laying vessel lays the pipeline by stepping away from the subsea structure.

A typical approach to pipe laying will involve careful design of the subsea structure and of the pipeline configuration in order to ensure that, when laid, the tie-in end of the pipeline is in the correct location and orientation with respect to the connector on the subsea structure. During the direct tie-in process, a very high tensile force is applied to the end of the pipeline, putting the pipeline under tension, in order to bring the end of the pipeline up to the connection point and complete the tie-in process. One of the reasons to put the installed pipe under tension is in order to allow for subsequent thermal expansion of the pipe that can occur during use. Without such tension, a pipeline may buckle as a result of the thermal expansion.

The forces applied to the pipeline during direct tie-in can be very high indeed. This makes high demands of the installation equipment and pipeline structure. A large area is needed for deflection of the pipeline to ensure acceptable forces during tie-in and during the subsequent thermal expansion. Furthermore, at least in the absence of some compensating mechanism, the forces can cause damage to the pipeline and to the connector on the subsea structure.

A prior proposal to overcome or at least mitigate the disadvantages of known direct tie-in procedures is found in WO 2015/149843. This document describes a method for direct tie-in of a subsea end of a pipeline that intends to minimise the forces on the connection between the pipeline and a subsea structure, minimise the forces required during the direct tie-in process, minimise the stresses on a deflected section of the pipeline near its subsea end, and minimise the area around the subsea structure required to accommodate the deflection of the pipeline. The method comprises, during introduction of the pipeline into the sea from a pipe laying vessel, applying a plastic deformation to a region of the pipeline at or close to an end of the pipeline to be tied-in and, either during or following tie-in, elastically deforming said region to increase its radius of curvature. This method provides significant advantages over the prior art techniques mentioned above, but it is focussed on installation via the reel-lay method.

Also, U.S. Pat. No. 4,591,292 discloses a method of connecting a flowline to a subsea structure. In this method, a special connection tool, which does not form part of the subsea structure, is used to attach the flowline to the subsea structure.

The technique(s) used for tie-in of pipelines can be linked with the design of the subsea installation as mentioned above. Many existing types of subsea equipment such as Christmas trees and manifolds are protected by a shielding structure that typically comprises a solid upper deck for protection from falling debris, and angled legs that support the upper deck and also give protection from trawling. There must be moving parts to allow for access to the shielded equipment, such as a hatch or hatches in the upper deck. A typical prior art shielding structure is shown in FIG. 1. The design of these structures hinders the use of some tie-in methods since the location for the coupling of the pipeline to the subsea installation will be shielded along with the other parts of the subsea equipment.

Viewed from a first aspect the invention provides a method for installing a subsea pipeline at a subsea structure, wherein the subsea structure includes a support in the form of a foundation or a supporting structure mounted to a foundation and being for transferring loads to the foundation, the method including: providing the support with a pull-in point at a proximal location, wherein the proximal location is at a first side of the support; providing the support with a strong point at a distal location, wherein the distal location is spaced apart from the proximal location and there is a straight clear path between the pull-in point and the strong point, this clear path bridging some of or all of a width of the support; passing a pull down wire through a guide at the strong point and using the pull down wire to pull in the pipeline; laying down the pipeline and passing the pull down wire along the clear path; and continuing the laying down and/or pulling in until a tie-in head of the pipeline is at a required location at the pull-in point.

The inventors have realised that it is possible to dispense with an initiation foundation/initiation pile as in prior art pull down techniques and to make use of the width of the support in order to enable the connection for the pull down wire, i.e. for the strong point, as described above, to be placed on the same support as the pull-in point. A sufficient distance can be allowed between the strong point and the pull-in point for the pull down method to work effectively, and in many cases this can be done without the need for extensive modification of the support. In fact it is advantageous to make use of a support of known design in order to allow for compatibility of this method with existing subsea structures, with the main modifications being a need for addition of a strong point (or a suitable mount for a strong point) and to ensure that an appropriate clear path is present. The latter may require some relocation of subsea equipment on the subsea structure in some cases.

Regarding U.S. Pat. No. 4,591,292, its subsea structure does not comprise a support that has a strong point or a pull-in point. Rather, the connection tool performs a pull in operation. The connection tool is not part of the subsea structure to which the flowline is installed.

The support that holds the strong point and the pull-in point can be direct use of the foundation or a support structure mounted to the foundation. Both of the strong point and the pull-in point are typically expected to be mounted to the same part, i.e. both on the foundation or alternatively both on a support structure that itself is mounted to the foundation. However it may be possible for the two points to be mounted on different structures.

In the case of direct use of the foundation, one example uses a suction pile as the foundation. Subsea equipment may be directly mounted to the suction pile with the clear path extending across the suction pile in between subsea equipment.

In the case of a support structure, the foundation may comprise multiple foundation elements such as piles or anchors with the support structure built across and supported by the multiple foundation elements. For example the support structure may be a framework having its footings at the foundation elements and being arranged to hold subsea equipment along with the strong point and the pull-in point, with the clear path again extending in between subsea equipment.

The support hence may also hold subsea equipment with the clear path lying in between subsea equipment. In some examples the support and the subsea equipment has a symmetrical arrangement with the clear path extending through a centre of the support.

The pull-in point and the strong point are at a proximal and a distal location respectively, with the terms proximal and distal as used herein referencing a near and far point of the support relative to the pipeline location. Hence the pull-in point is closer to the pipeline and the strong point is further from the pipeline. The pull-in point may be at a first side of the support. The strong point may be spaced from the pull-in point toward the other side of the support. For instance, the strong point may be located on the opposite side of the support, or may be located towards the centre of the support, preferably at a midpoint of the support. The strong point may be located across a diameter or a sufficiently long chord of a generally circular or generally elliptical structure or at two opposite sides of a polygonal structure such as a rectangle. The maximum length for the clear path will of course be provided when the strong point and pull-in point are at truly opposite sides, such as across a diameter of a circle or major diameter of an elliptical support, but this is not essential for the method to be effective as in many case a sufficient length for the clear path can be obtained with less than the maximum width, for example across a minor diameter of an elliptical structure or across a chord of a circle subtending an arc between 90 and 180 degrees, such as a 120 degree arc.

It may be preferable to have the strong point located towards the centre of the support if, for example, there are multiple pull-in points, one at a first side of the support and another at another (such as opposite) side of the support. The strong point in a central location can be used to install a pipeline as discussed herein for several such pull-in points. The central location of the strong point may be central with respect to two opposite sides of the support (e.g. anywhere distant from two opposite sides, preferably proximate to the midpoint between two opposite sides), or may be central with respect to all sides of the support (e.g. anywhere distant from all sides of the support, preferably at the centre of the support when viewed from above).

The reference to the required location of the tie-in head at the pull-in point may mean that the pipeline is sufficiently close to the pull-in point for the pipeline to be attached to the subsea structure using the method steps discussed below. For instance, the tie-in end of the pipeline may be within 2 m, 1 m, or 0.5 m of the pull-in point when it is at the pull-in point, with respect to the longitudinal direction of the pipeline. Additionally/alternatively, the tie-in end of the pipeline may be spaced from the pull-in point by less than 1, 2, 3 or 4 diameters of the pipeline in the radial direction of the pipeline (e.g. in a vertical direction, and/or in any or all direction(s) perpendicular to the longitudinal direction). Stated differently, the required location may be adjacent to the pull-in point.

The length of the clear path is known and the method may include using the length of the clear path to set a length of the pull down wire for extending across the clear path. The tension and length of the pull down wire can be tested onshore with this arrangement, because unlike when an initiation pile or similar is used as the strong point the distance between the strong point and the pull-in point is known accurately.

The length of the clear path may be between 2 m and 200 m, but is preferably 5-30 m, preferably 5-20 m, preferably 5-15 m, optionally 10-20 m. The standard width/diameter of a suction pile is typically around 5 m. It is preferable to use as much of the width of the foundation as possible, and if a frame support is used it is preferable to extend the width of the support greater than that of the foundation.

With a known length of the clear path the method may include use of an automated system for indicating when the pull down wire has reached the correct location relative to the strong point and hence when the tie-in head of the pipeline has reached the correct location relative to the pull-in point. The pull down wire and/or the strong point may hence include a trigger system, such as a latch mechanism, that is preferably activated automatically when the pull down wire is in the correct location. An example latch mechanism comprises a latch device on the pull down wire at a predetermined spacing from the tie-in head of the pipeline, wherein the latch device is for sending a signal to the system that pulls the pull down wire when the latch device reaches the strong point. The strong point may be provided with a specific structure for activating the latch device, or the latch device may be arranged to be activated upon reaching the strong point without any need for modification of the strong point (e.g. upon reaching the guide of the strong point). In the latter case the strong point may be a pulley such as a sheave as in the preferred embodiment and the latch device may be mechanically triggered upon contact with the sheave.

The pull-in point may be the point to which the (tie-in head of the) pipeline is to be attached to the subsea structure. The tie-in head of the pipeline may be the portion of the pipeline that is (to be) attached to the subsea structure at the pull-in point. A tie-in end of the pipeline may be the end of the pipeline on which the tie-in head is mounted.

This method may be used along with a method for tensioning the pipeline during installation and/or for allowing thermal expansion of the pipeline after tie-in. Various techniques are available for this. One option is the use of a tie-in spool, although as noted above this is often not attractive for cost reasons. Another option is to modify the pipeline to provide a tie-in end of the pipeline with a shape suitable for elastic deformation during installation and during thermal expansion. This can be done by applying a curvature through plastic deformation of the pipeline at the tie-in end. Techniques for applying such a curvature are disclosed in WO 02/057674, although for the purpose of straightening a pipeline rather than leaving a residual curvature. The method of WO 02/057674 can be adapted as described for example in WO 2015/149843 in order to create a tie-in and thermal expansion "loop" at the tie-in end, i.e. a zone of residual curvature where the pipeline has a lesser radius of curvature compared to the main length of the pipeline, which would typically be straight, i.e. infinite radius of curvature. More detail is set out below in relation to a possible method of using this technique for providing the tie-in end of the pipeline with a shape suitable for elastic deformation during installation and during thermal expansion.

The guide of the strong point may be any guide that is capable of changing the direction of the pull down wire whilst allowing the pull down wire to move through/past the guide under tension (e.g. when pulling down the pipeline). For example, the guide may be a fixed bar. The guide may be a pulley. The guide may comprise a horizontal member that acts to change the direction of the pull down wire and to transfer the tension in the pull down wire to the support.

The strong point is a structure for withholding the forces applied to the support via the pull down wire and for allowing movement of the pull down wire as the tie-in head of the pipeline is pulled in and laid down. The guide of the strong point may include a pulley, such as a sheave of the sort known for use with pull down wires. The strong point may be releasably mounted to the structure, hence allowing for the strong point to be a removable and reusable device. The support may hence comprise a mounting point for releasable attachment of the strong point. The guide of the strong point may be raised above the support by a certain height. This height may be such substantially equal to the height of the pipeline when it is resting in the elevated position of the cradle support (see below), such that the pull-down wire may extend horizontally between the pipeline and the guide when the pipeline is supported by the cradle support in the elevated position.

The method may comprise hooking up the pull down wire from a tensioning system at the sea surface to the strong point and to the pipeline (preferably the tie-in head of the pipeline). The hooking up may comprise attaching the pull down wire to the pipeline (e.g. by attaching the bracket to the pipeline and/or attaching the pull down wire to the bracket). Alternatively the pull down wire may already be attached to the pipeline. Preferably, when hooking up, the pipeline to which the pull down wire is attached is at/proximate to the sea surface. The hooking up may comprise passing the pull down wire from the tensioning system through the strong point (e.g. through the guide/pulley/sheave). The pull down wire may already be attached to a tensioning system at the sea surface, alternatively the method may comprise attaching the pull down wire to the tensioning system at the sea surface. The tensioning system may be a winch or the like. The tensioning system may be located on a vessel, such as on the deck of a ship of a platform.

The pull down wire may be attached to the pipeline via a bracket. The bracket may comprise a central hole through which the pipeline passes. The bracket may contact the pipeline (preferably the tie-in head) so that tension applied to the pull down wire is passed to the pipeline via the bracket. The bracket may be held in position on the pipeline (preferably the tie-in head) by gripping the pipeline (preferably the tie-in head).

Additionally/alternatively, the pipeline (preferably the tie-in head) may comprise a flange between the bracket and the end of the pipeline that prevents axial movement of the bracket toward the end of the pipeline.

The bracket may comprise at least one protruding portion that extends radially from the pipeline. The pull down wire may be attached to this protruding portion such that the pull down wire (when under tension) extends substantially parallel with the pipeline, but it is spaced radially therefrom. Preferably, the spacing of the wire allows the wire to clear any flange(s) on the end of the pipeline and the pull-in location of the subsea structure, which are typically present in order to connect the pipeline to the subsea structure. Preferably, there are a plurality of protruding portions, each having a respective pull down wire attached thereto. The bracket may be rotationally symmetrical when viewed along the longitudinal axis of the pipeline. The bracket may comprise two (only) protruding portions, preferably separated by 180°.

There may be a plurality of pull down wires. There may also be a plurality of corresponding features such as guides/pulleys/sheaves/winches etc. However, in some cases one guide/pulley/sheave/winch can handle the plurality of pull down wires. The plurality of pull down wires may extend parallel with each other and between the pipeline and the tensioning system via the strong point.

The method may comprise performing lay away of the pipeline. This may preferably occur after hook up of the pull down wire. Performing lay away may comprise apply a tension (preferably a constant tension) to the pull down wire using the tensioning system such that the pipeline to which the pull down wire is attached is pulled downwards, preferably generally toward the strong point or pull-in point. When the pull down wire is attached to the tie-in head, it may be the tie-in head that is pulled downwards.

Lay down of the pipeline may be performed until the pipeline comes to rest on a pipeline support. The pipeline support may support the pipeline relative to the sea bed and may provide a clearance between the sea bed and the pipeline. The pipeline support may preferably be a support bag. Using the pipeline support may allow the pipeline to be at rest without the need of introducing any bending moments during pull in of the pipeline. The pipeline support may support the pipeline at a tie-in end of the pipeline, i.e. at a location on the pipeline proximate to the tie-in head.

Additionally or alternatively, lay down of the pipeline may be performed until the pipeline comes to rest in a support cradle, as set out below. The support cradle and the pipeline support may be arranged so that the pipeline comes to rest on both during/after lay down.

The pipeline support may be arranged to support the pipeline throughout all heights of the support cradle, as the support cradle changes elevation (see below). Alternatively, the cradle may support the pipeline immediately after lay down in an elevated location. Once the cradle is lowered to allow for connection to the subsea structure, only then may the pipeline support begin to support the pipeline.

The required location for the tie-in head of the pipeline may be at a support cradle provided adjacent to the pull-in point. The tie-in head may be locked to the support cradle once it is in a suitable position. Connection of the pipeline to the subsea structure may proceed in accordance with any suitable technique. The method may involve immediate connection of the tie-in head to a pipeline coupling once it has been pulled to the pull-in point, but preferably the pipeline is first flooded, for example by use of a suitable pig. The support cradle may hence be used to first support the pipeline for access to a pig launch receiver at the tie-in end of the pipeline, with the pig launch receiver being used to launch a pig and thereby flood the pipeline, before the pig launch receiver is removed and the tie-in head of the pipeline is then connected to the subsea structure. The pipeline may remain in the support cradle during this process, for example with the support cradle first at an elevated location for access to the pig launch receiver, and the support cradle then being lowered to allow for connection of the pipeline to the subsea structure.

Once the pipeline is at the correct height and at the correct general location for connection of the pipeline to the subsea structure, the pipeline may be moved into position for connection to the subsea structure, and preferably connected to the subsea structure, by being moved laterally. This may be achieved by attaching a stroking cylinder to the pipeline and stroking the pipeline into position. There are conventional techniques for doing this of which the skilled person would be aware.

Once the pipeline is connected to the subsea structure, the pipeline may be locked in place. This may preferably be achieved by using a clamp, such as a hydraulic clamp. The tie-in head may be locked to the subsea structure.

Preferably, the subsea structure is located subsea, such as on the sea bed.

The subsea equipment, the subsea structure and/or the pull-in location may comprise protection for protecting the subsea equipment, the subsea structure and/or the pull-in location (respectively) from damage, for example which could be caused by contact with the pipeline when the pipeline is laid down or pulled in. This protection may comprise bumper bars in the vicinity of and/or surrounding the subsea equipment, the subsea structure and/or the pull-in location.

The method may comprise, during introduction of the pipeline into the sea from a pipe laying vessel, applying a plastic deformation to a region of the pipeline at or close to an end of the pipeline to be tied-in and, either during or following tie-in, elastically deforming said region to increase its radius of curvature. As an option, said region may be located within 200 m, and more preferably 100 m, of the tie in end of the pipeline. As an option, the method may comprise laying the tie-in end of the pipeline on or close to the seabed and pulling the tie-in end towards the subsea structure, said action of pulling resulting in the elastic deformation of said region. Said step of pulling may be achieved using the pull down wire and the tensioning system (such as the winch) discussed above.

The method may comprise attaching weights and/or buoyancy devices at or close to the tie-in end of the pipeline in order to control the orientation and location of the pipeline during lay down and pull-in.

As an option, the step of applying a plastic deformation to a region of the pipeline at or close to an end of the pipeline to be tied-in may comprise establishing a residual curvature strain of between 0.2% to 0.3%.

As an option, said pipeline may be a steel pipeline.

There may be a heater attached to or at least adjacent to the pipeline. The heater may be attached to the pipeline before or after lay down or tie in. The heater may comprise an electrical cable. The heater may run along the length of the pipeline.

The heater may terminate a distance from the subsea structure, such as at least 1 m, 5 m or 10 m.

Alternatively, the heat means may cease to be attached to or adjacent to the pipeline at a distance from the subsea structure, such as at least 1 m, 5 m or 10 m, but may continue on to a second pipeline (such as a second pipeline connected to the subsea structure (e.g. using the present method) or to a second pipeline present in the vicinity of the subsea structure or to a second pipeline connected to another subsea structure in the vicinity of the subsea structure). The heater may therefore heat a plurality of pipelines, and may be routed around (rather than through) the subsea structure. This may particularly be the case for when the heater is a (high voltage) AC cable.

Alternatively, the heater may terminate at or on the subsea structure. In this case, a second heater may be connected to the heater, preferably at the termination location. The second heat means may take energy from the heater and heat a second pipeline connected to the subsea structure (e.g. by the present method) or to a second pipeline in the vicinity of the subsea structure. The heater may be thought of as being routed through (rather than around) the subsea structure. This may particularly be the case for when the heater is a (low voltage) DC cable.

Alternatively, the heater may be routed directly through the subsea structure (e.g. from one pipeline to another pipeline both connected to the subsea structure, or in the vicinity of the subsea structure). In this case, the heater may not terminate on the subsea structure, rather it may be continuous.

When the heater is an electrical cable, the heater may also be able to power components and instrumentation and the like present at the subsea structure. This is particularly the case when the cable passes through, terminates on, or passes near the subsea structure.

Viewed from another aspect the invention provides a system for installing a subsea pipeline at a subsea structure, wherein the subsea structure comprises a support as part of the subsea structure, the support being in the form of a foundation or a supporting structure mounted to a foundation and being for transferring loads to the foundation; wherein the support comprises a pull-in point at a proximal location, wherein the proximal location is at a first side of the support; wherein the support comprises a strong point or a mount for a strong point to which a strong point is connected at a distal location, wherein the distal location is spaced apart from the proximal location and there is a straight clear path between the pull-in point and the strong point, this clear path bridging some of or all of a width of the support; wherein the strong point comprises a guide, the guide being configured such that a pull down wire may pass therethrough and such that the guide may be used in conjunction with the pull down wire and the straight clear path to lay down and pull in the pipeline toward the pull-in point.

Thus, the strong point is placed on the same support as the pull-in point.

The system may comprise an automated system for indicating when the pull down wire has reached the correct location relative to the strong point and hence when the tie-in head of the pipeline has reached the correct location relative to the pull-in point.

The system may also comprise a means for tensioning the pipeline during installation, such as the tie-in spool or providing a tie-in end of the pipeline with a shape suitable for elastic deformation during installation and during thermal expansion, as discussed above.

The system may comprise a pull down wire, as discussed above. The pull down wire may be attached to the pipeline. The pull down wire may be passed through the strong point. The system may comprise a tensioning means. The pull down wire may be attached to the tensioning means.

The system may comprise a pipeline support for supporting the pipeline after lay down. More details of the pipeline support are discussed above.

The system may comprise a support cradle for supporting the pipeline after lay down. More details of the pipeline support are discussed above.

The system may comprise a locking mechanism for locking the tie-in head to the support cradle once the pipeline is in a suitable position.

The system may comprise a pig for flooding the pipeline prior to connecting the pipeline to the subsea structure. The pig may be actuated by a big launch receiver, preferably attached to the tie-in head of the pipeline. The pig launch receiver may be removably attached to the (tie-in head of the) pipeline.

The system may comprise a lateral moving means for moving the pipeline into position laterally for connection to the subsea structure once the pipeline is at the correct height. This means may comprise a stroking cylinder. This is preferably attached to the pipeline. The stroking cylinder may be configured to stroke the pipeline into position.

The system may comprise a lock for locking the pipeline in place once the pipeline is connected to the subsea structure. The lock may preferably be a clamp, such as a hydraulic clamp.

Preferably, the system and/or subsea structure is located subsea, such as on the sea bed.

The system may comprise a means for applying a plastic deformation to a region of the pipeline at or close to an end of the pipeline to be tied-in and, either during or following tie-in, elastically deforming said region to increase its radius of curvature, during introduction of the pipeline into the sea from a pipe laying vessel.

The system may comprise weights and/or buoyancy devices attached to the pipeline, preferably at or close to the tie-in end of the pipeline, for controlling the orientation and location of the pipeline during lay down and pull-in.

The system may comprise the pipeline.

The system may be configured to perform any of the methods discussed herein.

The system may comprise any of the features discussed herein.

An arrangement for a subsea installation that can be advantageously used with the above tie-in method and hence may be included in the above system includes a subsea equipment-protection apparatus comprising a cap and a sleeve, wherein the cap and the sleeve are configured to be supportable by a foundation of the subsea equipment; and the cap and the sleeve are arranged such that at least a portion of the cap may enter an opening of the sleeve and be supported by the sleeve; the cap and sleeve thereby covering and protecting the subsea equipment.

A foundation of some sort for the subsea equipment must be present to support the subsea-equipment, regardless of whether or not it is desired to protect the subsea-equipment. Thus, the cap and sleeve arrangement described above advantageously utilises the foundation of the subsea-equipment to support the protection apparatus. No additional foundations are required. Moreover, the arrangement of the foundation that is required to support such a sleeve lends itself well to the inclusion of a strong point as discussed above, with the strong point (or mounting for the strong point) being located on the foundation in order to thereby provide a location for direct tie-in of a pipeline by pulling it from the strong point at a distal location on the foundation toward a tie-in point spaced apart from the strong point and at a proximal location on the foundation. There are hence significant benefits to the combination of the cap and sleeve arrangement in relation to minimisation of the foundations required both for the tie-in method (by elimination of the initiation foundation) and for the subsequent use of the subsea equipment (by the use of single foundation for both the equipment and the protection apparatus). It will also be understood that the cap can easily be removed during the tie-in process to allow unimpeded access for the pull down wire to span the foundation.

In some example embodiments, as discussed further below, the foundation may be coupled to the sleeve prior to installation of the foundation. The strong point may be attached to the foundation via the sleeve and/or it may be joined to both of the foundation and the sleeve.

The protection apparatus may be sized to fit closely about the subsea equipment, making it significantly more lightweight than the known protection apparatus.

Since the protection apparatus is supported by a foundation that would be present regardless of whether the protection apparatus is present, it is possible to use standard techniques to install the subsea installations on the sea bed. Further, it is possible to retro-fit existing subsea installations with this protection apparatus. In addition, it is possible to easily adapt future subsea installations to include this protection apparatus.

Further still, in contrast with the existing protection apparatus, due to the cooperation of the sleeve and the cap, the cap may be lifted off the subsea equipment. Thus, the subsea equipment can be easily exposed, e.g. for maintenance purposes.

The cap may have a hollow convex top portion. This shape reduces the possibility of trawler nets, etc. catching and snagging on the protection apparatus. Further, it allows for sufficient space to house the subsea equipment. It should be noted that as used herein the reference to the top/upper parts and bottom/lower parts are with reference to the orientation of the device when in use, where the base will be closer to the sea-bed (or other underwater surface) and the top will be further from the sea-bed. Similarly, references to a vertical direction or horizontal direction are used in a manner that is consistent with this, with the horizontal being generally parallel with the sea-bed and the vertical extending normal from the sea-bed.

The convex top portion may be continuously curved, or may be formed from a plurality of appropriately angled adjacent flat sections (e.g. to form a complex polyhedron), or may be formed from a mixture of curved and flat sections.

The hollow convex top portion may be generally dome-shaped. The dome-shape may be circular or non-circular in plan. The dome may be a spheroid-shaped dome (e.g. either a spherical dome, or an oblate spheroid-shaped dome, or a prolate spheroid-shaped dome, etc.) or a non-spherical dome (e.g. an ovoid-shaped dome or a capsule-shaped dome, etc.). Thus, when in use, the horizontal cross-section (i.e. the plan view) of the convex top portion may be a circle, an ellipse, an oval or a stadium, etc.

Further, the cap may comprise a top portion having a plurality of hollow convex shapes adjacent one another.

The exact shape and form of the cap should be decided based upon the shape of the subsea equipment it is designed to protect. For example, for a Christmas tree, a circular cross-section (in plan view) may be used, and for a manifold an oval or stadium cross-section (in plan view) may be used The cap may comprise a lower portion. The lower portion may be configured to enter the sleeve. The lower portion may be the base of the convex top portion. The lower portion may comprise a wall extending from the base of the convex top portion. The wall may extend from the entire perimeter of the convex top portion. Opposing portions of the wall may be parallel with one another (i.e. the wall may form a tube-like portion). The lower portion may be received fully within the sleeve when the cap is in use, or alternatively a part of the lower portion may remain outside of the vertical extent of the sleeve during use.

The cap and the sleeve may have a corresponding shape. When in use, the cross-sections (taken in a horizontal plane) may have corresponding shapes.

The inner dimension of the cross-section of the sleeve may be approximately equal to, or greater than, the outer dimension of the cross-section of the cap. Alternatively, the inner dimension of the cross-section of the cap may be approximately equal to, or greater than, the outer dimension of the cross-section of the sleeve. By "approximately equal to" it is meant that the relevant dimensions are set such that there is close fit between the cap and the sleeve, such that relative movement is reduced. There will, of course, always be a certain degree of tolerance present, such as between 50 to 250 mm.

Thus, the cap may be prevented from rotating/pivoting inside the sleeve by the required tolerance. Hence, the only way of removing the cap from its geometrical lock may be by lifting it vertically.

However, it is not essential to have the dimensions of the cap match those of the sleeve. Indeed, one advantage of this protection apparatus is that an exact size match of the sleeve and the cap is not necessary, and hence the need for custom-built caps/sleeves is greatly reduced.

For example, the sleeve may be approximately 6 m to 20 m across. If circular in cross-section, the diameter of the sleeve may be approximately 6 m to 20 m. If rectangular in cross-section, the sleeve may have dimensions of approximately 6 m to 20 m by 6 m to 20 m. The dimensions of the cap may be substantially similar to those of the sleeve, but may have a small reduction for clearance, for example of around 50 to 250 mm.

The subsea equipment-protection apparatus may be configured such that the cap is held in position by the sleeve and the weight of the cap. Thus, the cap may not be fixed to the foundation/sleeve/sea bed. This eases its installation and removal. The cap may be removed when access to the subsea equipment is desired.

The cap may be a moulded cap. This greatly eases manufacture of the cap. Since the cap can have a convex hollow shape, moulding can be especially advantageous to easily manufacture such complex shapes. In contrast, the known protection apparatus requires fabrication such as cutting, fitting, welding, etc. The cap may be moulded from composites, such as FRP, GRP and the like.

The cap may include a sandwich construction. Such a construction may provide reinforcement of the cap, and may provide the cap with thermal insulation properties.

The cap may provide thermal insulation so as to prevent heat loss from the subsea equipment. The cap may be constructed of a thermally insulating material.

The cap may consist of one component. This may ease manufacture, installation and removal of the cap.

Alternatively, the cap may comprise a plurality of sections. This may ease access to the subsea equipment. For example, the cap may comprise a hatch. The hatch may be positioned at the top of the cap when in use. The hatch may be removable.

The cap may be formed of two-sections. Each segment may be approximately half of the cap. The respective sections may be symmetrical with one another. The sections may touch when installed. There may be a gap between the sections when installed.

The cap may have an unbroken surface. By "unbroken surface" it is meant that the surface of the cup is substantially free of holes. This provides good protection over the entirety of the subsea equipment.

The convex top portion of the cap may have an unbroken surface. An upper part of the convex top portion may have an unbroken surface. The unbroken surface may extend from the top of the cap far enough down the cap such that installation of the protection apparatus is eased (for example, far enough that when the cap is inverted, the cap or protection apparatus as a whole can float). As is described in more detail below, the cap may be inverted during transport, such that it effectively forms a hull-shape. The cap thus can float and can be towed out to sea to the desired location.

The cap may comprise holes. This reduces the weight of the cap, the amount of material used and the hydrodynamic forces associated with moving the cap, e.g. during installation. In addition, it can allow for easy inspection of the subsea equipment located within the cap. The holes may be formed in the lower portion. The holes may be formed in the convex top portion. The holes may be formed in a lower part of the convex top portion. The cap may comprise a cage.

The cap may have a stackable shape, for example with angled walls slightly off vertical similar to stackable cups, thereby enabling multiple similar caps to be transported in a stack.

The sleeve may be configured to be fixed to the foundation. This allows the sleeve to held in position relative to the foundation, sea bed and subsea equipment, and hence act as a support to other components (e.g. the cap). As noted above, the foundation may advantageously be coupled to the sleeve prior to installation of the foundation. The sleeve may be joined to the foundation during fabrication by any suitable means.

This feature is particularly beneficial when the foundation is a cylindrical foundation such as, for example, a suction pile. Thus, in one preferred set-up, the subsea equipment-protection apparatus includes a foundation coupled to the sleeve, preferably joined to the sleeve before the foundation is installed, and optionally a suction pile foundation. When installing the apparatus, the suction pile (with sleeve attached) may first be secured to the sea bed, and then optionally a conductor/pipe for the subsea equipment may be installed through the suction pile.

The sleeve may comprise generally vertically extending walls about the opening for the cap.

The sleeve may comprise holes, for example holes through the vertical walls. These holes reduce the weight of the sleeve, and allow inspection of the subsea equipment. The holes in the sleeve may be placed to align with holes in the lower portion of the cap.

The sleeve may be configured to support the weight of the cap, and to support the cap in a lateral direction. The sleeve may contact the lower portion of the cap. The sleeve may contact the base of the cap. The sleeve may comprise one or more component(s) extending inward, or outward, from the walls of the sleeve. The cap may rest on the component(s). The component may comprise a shelf. The components may comprise a plurality of bars. The component(s) may be positioned at a height (such as around 2 m) above the sea bed. This allows the cap to rest at this height above the seabed. This means the cap need not extend to the sea bed, and hence can be reduced in size. Further, it allows for inspection of the subsea equipment through only the sleeve below the horizontal components. Alternatively, the weight of the cap may be supported directly by the foundation.

The horizontal cross-section of the sleeve may be a circle, an ellipse, an oval or a stadium, or any shape complementing the shape of the cap. This shape may be of the inner dimension of the sleeve, or of the inner and outer dimension of the sleeve.

The subsea equipment-protection apparatus may comprise an angled trawl deflector between the seabed and the sleeve and/or cap. The trawl deflector further prevents trawler nets, etc. catching and snagging on the protection apparatus. The trawl deflector may be configured to circumferentially surround the cap.

The trawl deflector may be angled at between 45° and 60° relative to the seabed. The trawl deflector may extend from the seabed. The trawl deflector may extend to the top of the sleeve.

The trawl deflector may comprise a plurality of struts arranged to extend at an angle between the sleeve/cap and the seabed/foundation. The struts may be substantially equally spaced around the perimeter of the sleeve.

The trawl deflector can include a frustoconical surface arranged to extend between the sleeve/cap and the seabed/foundation.

The trawl deflector may be configured to be supported in a lateral direction by the sleeve. The trawl deflector may have a horizontal cross-section (i.e. in plan view) that is complementary in shape to that of the sleeve. The trawl deflector may have an inner dimension that is approximately equal to (but marginally larger than) the outer dimension of the sleeve. This allows the trawl deflector to fit over the sleeve, and be supported by the sleeve. The inner dimension of the trawl deflector may be greater than the outer dimension of the sleeve.

The trawl deflector may generally be hollow. The trawl deflector may comprise holes through its outer surface. This helps to reduce the weight of the protection apparatus and to reduce the hydrodynamic forces associated with moving the apparatus, e.g. during installation. Further, the holes may be used to inspect the subsea equipment without removing the trawl deflector.

The trawl deflector may be configured to be held in position by the weight of the trawl deflector. Thus, the trawl deflector may not be fixed to the foundation/sleeve/sea bed. This eases its installation and removal. The trawl deflector may be removed when access to the subsea equipment is desired.

The trawl deflector may be fixed to the sleeve and optionally both the sleeve and trawl deflector may be coupled to the foundation before installation of the foundation.

The protection apparatus may comprise a flexible flow line, wherein the trawl deflector supports the flexible flow line. The flexible flow line may be present to connect the subsea equipment to nearby subsea equipment, or to equipment on the surface.

The flexible flow line may be coiled around the outer circumference of the trawl deflector, preferably the frustoconical trawl deflector, as this shape allows for easy coiling/uncoiling. Retainer straps may hold the flow line in place when desired (e.g. during installation of the trawl deflector).

The protection apparatus may comprise a leak-monitoring device such as, for example, a pressure sensor or a gas sensor. This may be provided on the interior surface of the cap. The device may be located above the subsea equipment. The device may be located in an upper region of the cap. The device may be located at the uppermost point of the interior surface of the cap.

The leak-monitoring device may be fixed to the subsea equipment. Optionally the leak-monitoring device is not fixed to the cap. The leak-monitoring device may be suspended above the subsea equipment in an upper region of the cap. This is advantageous since the cap can be removed from the subsea equipment without removal of the leak-monitoring device. This allows the cap to be removed without having to disconnect the leak-monitoring device from, for example, a surface-based monitoring system to which the device may be connected. This eases removal of the cap.

Leak-monitoring of subsea equipment is an important consideration. In known protection systems, no such leak-monitoring is provided. Instead, the leak-monitoring may be provided integrally as part of the subsea-equipment. Due to the presence of the cap and the location of the leak-monitoring device, leaking hydrocarbons may gather in an upper region of the cap. These leaking hydrocarbons, which are typically less dense than water, displace water from the upper region of the cap and may be held in the upper region of the cap by the cap. In this regard the dome-shaped cap is particularly advantageous.

The cap may comprise a hole in an upper portion of the cap, for example a circular hole. The hole may be provided at the upper most position of the cap. The hole may be provided at a centre of symmetry of the cap. Such a hole may be used during the installation of the cap, as explained further below. The hole may be configured (e.g. shaped/sized) such that a lifting device and/or lifting wire may be inserted through the hole.

The cap may comprise a tubular portion extending from the hole (i.e. from the edge of the cap forming the hole) and into the upper portion of the cap. Thus, a cavity may be formed between the tubular portion and the cap. The leak-monitoring device may be positioned in this cavity. This cavity may allow leaking hydrocarbons to be gathered even when the hole is present. The tubular portion may also provide strengthening to the hole, which may be advantageous when the cap is lifted/moved by a lifting device and/or lifting wire inserted through the hole.

The hole may also provide access through the cap to the subsea-equipment, e.g. for a conveyance/pipeline, even when the cap is in position.

In another aspect, the invention provides a subsea installation comprising a piece of subsea equipment mounted to a foundation and a strong point for attachment to a pull down wire or a mounting for such a strong point as described above, the strong point or mounting being coupled to the foundation as described above, the subsea installation optionally comprising a subsea-equipment-protection apparatus as described above, wherein the sleeve is mounted to the foundation and surrounds the subsea equipment, and wherein the cap covers the subsea equipment.

As discussed above, the foundation may be provided by a suction pile. A suction pile is advantageous since it is lightweight and easy to install. A suction pile may be referred to as, and may encompass, a suction caisson, a suction anchor, a suction bucket and/or a suction can.

The piece of subsea equipment may be equipment for oil and gas production, for example it may be a Christmas tree or a manifold. The piece of subsea equipment may be a pump station, a chemical treatment station, a separation module, an umbilical termination head, a controls system module or a power and hydraulic unit.

In order to install the Christmas tree on the suction pile, the suction pile may first be secured to the sea bed, and then a conductor/pipe may be installed through the suction pile. Examples of such methods can be seen in US 2012/0003048.

In a further aspect, the invention also provides a subsea system comprising a plurality of the subsea installations described above, wherein the subsea installations are connected in a satellite arrangement. The system may include, for example, a manifold connected to multiple Christmas trees, with each of the manifold and the Christmas trees being protected by means of a sub-sea protection apparatus as described above.

In known subsea systems where the pieces of subsea equipment are protected, all of the subsea equipment is located under a single, large protective cover. In contrast, the present invention allows different pieces of subsea equipment to be protected by different protection equipment. This allows the different pieces of subsea equipment to be distributed as desired (which can be over a considerable area, for example spread about an area of up to 200 m radius), rather than being forced to house all the equipment at the same location.

The separation of the pieces of subsea equipment can be further advantageous since other pieces of subsea equipment (e.g. a booster pump) can be added to the subsea system between the existing pieces of subsea equipment without having to move/disturb/rearrange the existing subsea pieces of equipment.

The pieces of subsea equipment may be connected to one another via one or more pipeline(s) on the sea bed. The pipeline(s) may be protected by one or more concrete mattresses. These pipeline(s) may have been installed using any of the method(s) or system(s) discussed herein.

Viewed from a further aspect, the invention provides a method for installation of a subsea installation comprising: installation of the subsea equipment-protection apparatus described above by: mounting the sleeve to the foundation of the subsea equipment; locating the cap at the opening of the sleeve, and inserting the at least a portion of the cap into the opening of the sleeve so that the cap is retained within the sleeve, as well as using the method of the first aspect (including possibly the optional/preferred features thereof) for tie-in of a pipeline to the subsea installation either prior to insertion of the cap, or at a later time with temporary opening/removal of the cap during tie-in. The method may include providing the subsea equipment-protection apparatus or parts thereof with features as discussed above.

The method may include transporting the cap and/or sleeve to the installation site, for example via a barge or by floating it and towing it. Advantageously, the cap may be floated to the installation site. This means that the cap may be installed without the need for a large vessel or a vessel with lifting capacity. In embodiments where the cap has an unbroken surface (e.g. for the top/upper portion) then the cap may be inverted and may float without the need for additional buoyancy. Alternatively, or additionally, the cap may have a stackable shape, thereby enabling multiple similar caps to be transported in a stack.

The cap may be located at the opening by sinking the cap, for example by capsizing an inverted cap to flood it, or by releasing air from a non-inverted cap so that it floods with water from beneath as it is submerged. Once submerged the cap may be hung from a line, or multiple lines, and directed to be above the opening in the sleeve. Again, this procedure can conveniently be carried out by a small vessel with no need for a large lifting capacity.

The cap may be held within the sleeve simply by its weight. This means that there is no need for any kind of complex subsea operation when installing the cap.

The sleeve may be mounted to the foundation by any suitable means. In some advantageous example embodiments the sleeve is coupled to the foundation before installation of the foundation. This means that the sleeve and foundation can be transported and installed together, which minimises the sub-sea work that is required.

The foundation may be installed using known techniques. A preferred foundation type for some embodiments is a suction pile. This can easily be installed with the sleeve already coupled to the suction pile as discussed above, since the method of installation of a suction pile is not hindered by a sleeve being present atop the pile. In some example embodiments the sleeve together with the suction pile is installed and then a conductor or pipe is installed through the pile to the sea bed for the subsea equipment.

The subsea-equipment may be installed after the sleeve is installed (which may be with the foundation or subsequently), and the cap is fitted once the sub-sea equipment is in place.

When the foundation is a suction pile and this is joined to the sleeve before installation then the sleeve and pile assembly may advantageously be transported by floating, for example with the assembly inverted. As with floating of the cap this means that no special vessel is required. A small vessel with a modest lifting capability can be used. The sleeve and pile may be submerged using known techniques for suction piles and then steered to the required location on the sea-bed, again using known techniques. With this approach the equipment and training required to install the sleeve is very similar to that required to install the suction pile and consequently the cost of introducing the sleeve and cap system is minimised.

Certain preferred embodiments of the invention will now be described by way of example only and with reference to the accompanying drawings in which:

FIG. 5 is a side cross-section of a subsea equipment-protection apparatus for a manifold or the like;

Figure 11:
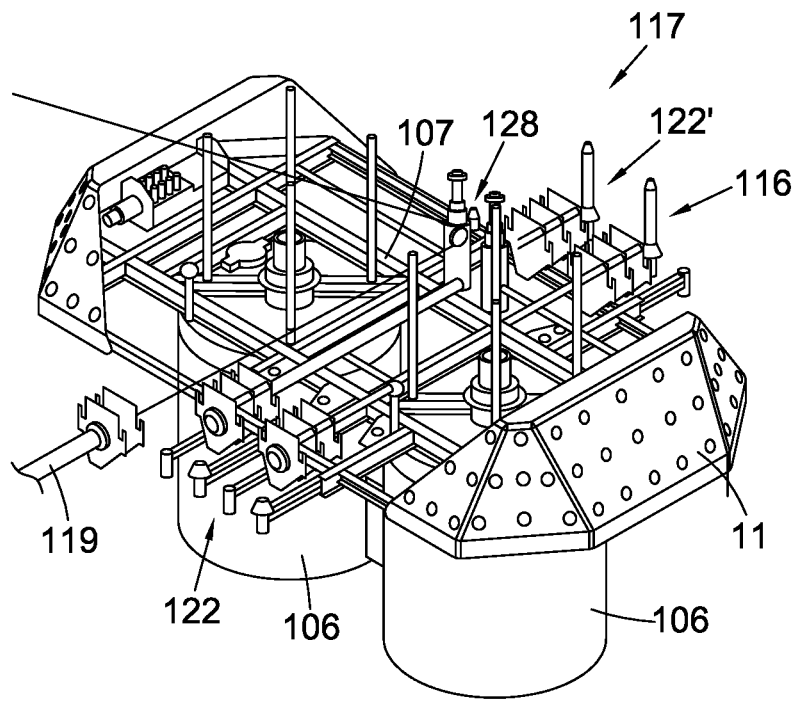
FIG. 11 is a perspective view of another subsea structure adapted for use with the method of FIG. 1, including the pull-down wire attached to the strong point.
Figure 12:
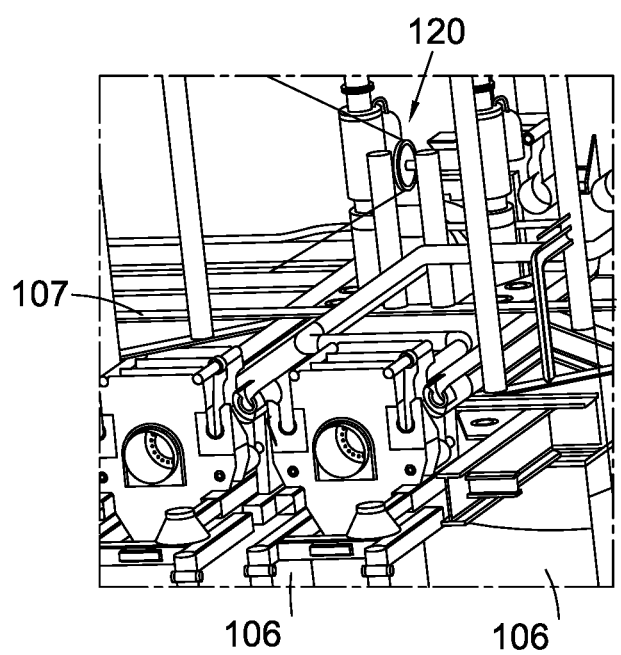

FIG. 12 detail of FIG. 11 in enlarged view; and

Figure 13:
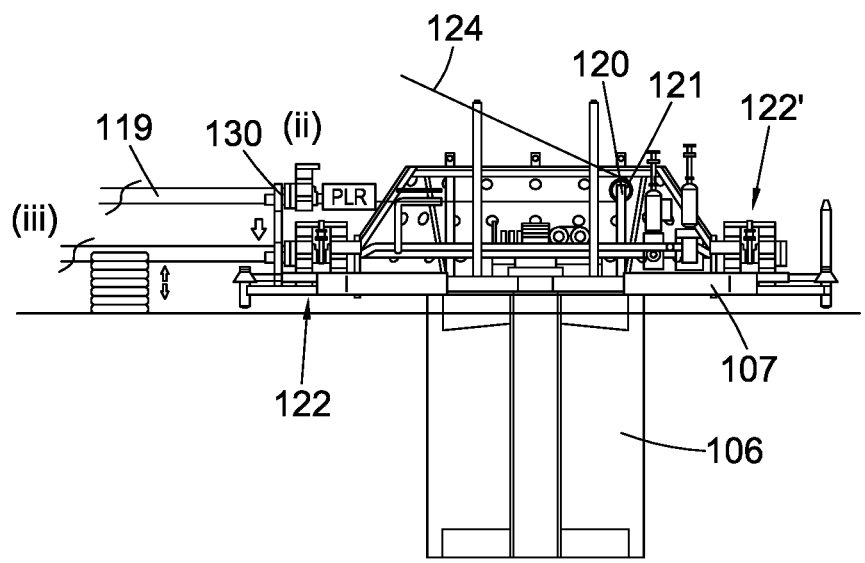

FIG. 13 is a side view showing the same structure as FIG. 11 and indicating the location for the pipeline when installed as well as the location for insertion of a pig via the pig launcher receiver.

Figure 1:
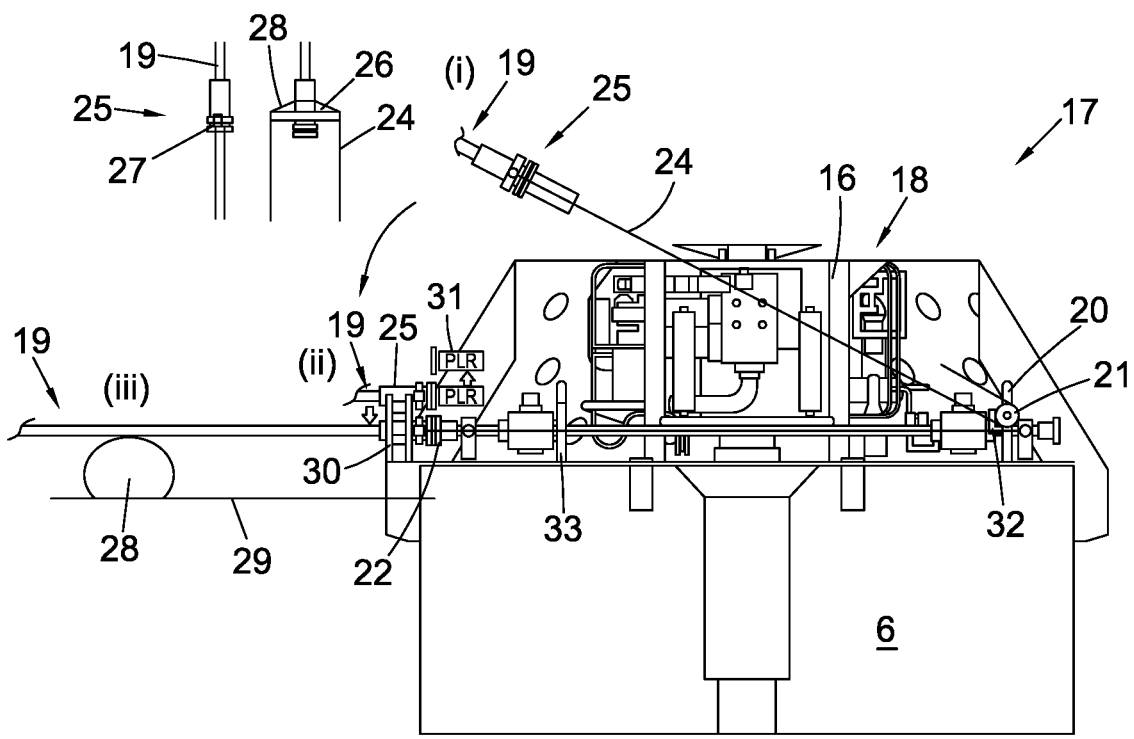
FIG. 1 illustrates the basic principles for a direct tie-in pull down method.

With regard to FIG. 1A, an embodiment of the method and the system is illustrated. The system 17 is a system 17 for installing a subsea pipeline 19 at a subsea structure 18. The subsea structure 18 comprises a support 6 as part of the subsea structure 18. In the embodiment of FIG. 1, the support 6 is in the form of a foundation 6. The support 6 comprises a pull-in point 22 at a proximal location. The proximal location is at a first side of the support 6 (i.e. the left hand side of the support 6 in FIG. 1). The support 6 comprises a strong point 20 at a distal location. The distal location is spaced apart from the proximal location. There is a straight clear path between the pull-in point 22 and the strong point 20. This clear path bridges substantially all of the width of the support 6. The strong point 20 comprises a pulley 21. The pulley 21 is configured such that a pull down wire 24 can pass through the pulley 21 and such that the pulley 21 can be used in conjunction with the pull down wire 24 and the straight clear path to lay down and pull in the pipeline 19 toward the pull-in point 22. More details of the system 17 and the method of its use are discussed below.

The present system 17 does not require an initiation foundation/initiation pile, as in prior art pull down techniques. Rather, it makes use of the width of the support 6 in order to enable the connection for the pull down wire 24. Thus, the strong point 20 is placed on the same support 6 as the pull-in point 22. In the embodiment of FIG. 1, both the strong point 20 and the pull-in point 22 are mounted to the same foundation 6. The foundation 6 is a suction pile 6. Subsea equipment 16 is directly mounted to the suction pile 6 with the clear path extending across the suction pile 6 in between subsea equipment 16.

The pull-in point 22 and the strong point 20 are at a proximal and a distal location respectively, with the terms proximal and distal as used herein referencing a near and far point of the support 6 relative to the pipeline 19 location. Hence the pull-in point 22 is closer to the pipeline 19 and the strong point 20 is further from the pipeline 19. The pull-in point 22 is at a first side of the support 6 and the strong point 20 is at an opposite side of the support 6. In the embodiment of FIG. 1, the support 6 and structure 18 are generally circular in plan and the pull-in point 22 and the strong point 20 are located across the diameter of the support 6 and structure 18.

The strong point 20 is a structure for withholding the forces applied to the support 6 via the pull down wire 24 and for allowing movement of the pull down wire 24 as the tie-in head 25 of the pipeline is pulled in and laid down The pipeline 19 comprises a tie-in head 25 of the pipeline 19. The tie-in head 25 is the portion of the pipeline 19 that is (to be) attached to subsea structure 18 at the pull-in point 22.

More details of the tie-in head 25 can be seen in FIG. 1B. As can be seen from FIG. 1B, the pull down wire 24 is attached to the pipeline 19 via a bracket 26. The bracket 26 comprises a central hole through which the pipeline 19 passes. The bracket 26 contacts the tie-in head 25 of the pipeline 19 so that tension applied to the pull down wire 24 is passed to the pipeline 19 via the bracket 26. The bracket 26 is held in position on the tie-in head 25 of the pipeline 19 by gripping the tie-in head 25. Further, the tie-in head 25 of the pipeline 19 comprises a flange 27 between the bracket 26 and the end of the pipeline 19. The flange 27 prevents axial movement of the bracket 26 toward the end of the pipeline 19. Thus, when tension is applied to the wire 24, tension is transferred to the pipeline 19.

The bracket 26 comprises two protruding portions 28 that extend radially from the pipeline 19, when the bracket 26 is in position. There are two pull down wires 24, each attached to respective protruding portions 28 such that the pull down wires 24 (when under tension) extend substantially parallel with the pipeline 19, but are spaced radially therefrom. The spacing of the wires 24 allows the wires 24 to clear the flange(s) 27 on the end of the pipeline 19, and any flange(s) at the pull-in location 22 of the subsea structure 18. The bracket 26 is rotationally symmetrical when viewed along the longitudinal axis of the pipeline 19.

From the tie-in head 25, the pull down wire 24 passes to the pulley 21 of the strong point 20 and then to a tensioning means (not shown), such as a winch on the deck of a vessel on the sea surface. The pulley 21 is raised above the support 6 by a certain height.

The system 17 comprises a pipeline support 28 for supporting the pipeline 19 after lay down of the pipeline 19. The pipeline support 28 supports the pipeline 19 relative to the sea bed 29 and provides a clearance between the sea bed 29 and the pipeline 19. The pipeline support 28 is in the form of a support bag. The pipeline support 28 supports the pipeline 19 at a tie-in end of the pipeline 19, i.e. at a location on the pipeline 19 proximate to the tie-in head 25 and proximate to the subsea structure 18.

The system 17 comprises a support cradle 30 for supporting the pipeline 19 after lay down. The support cradle 30 contacts and supports the tie-in head 25 of the pipeline 19. The support cradle 30 is configured to be raisable and lowerable between an elevated position (see state (ii) in FIG. 1A) and a lowered position (see state (iii) in FIG. 1A). As is discussed below, a pig is actuated at the elevated position and the pipeline 19 is connected to the subsea structure 18 at the lowered position.

The system comprises a pig for flooding the pipeline 19 prior to connecting the pipeline 19 to the subsea structure 18. The pig is actuated by a pig launch receiver 31, which is attached to the tie-in head 25 of the pipeline 19 during lay down, and which is removed (as can be seen from the arrow in FIG. 1A) from the tie-in head 25 after actuation of the pig.

The system 17 comprises an automated system (not shown) for indicating when the pull down wire 24 has reached the correct location/distance relative to the strong point 20 and hence when the tie-in head 25 of the pipeline 19 has reached the correct location relative to the pull-in point 22. This correct distance is shown in state (i) of FIG. 1A.

The strong point 20 includes a trigger system 32, such as a latch mechanism 32, that is activated when the pull down wire 24 is in the correct location. The latch mechanism 32 comprises a latch device 32 on the pull down wire 24 at a predetermined spacing from the tie-in head 25 of the pipeline 19, wherein the latch device is for sending a signal to the system that pulls the pull down wire when the latch device reaches the strong point 20. The latch device 32 is mechanically triggered upon contact with the pulley of the strong point 20.

The subsea structure 18 comprises protection 33 for protecting the subsea equipment 16 from damage. This protection 33 comprises bumper bars/frame 33 in the vicinity of and/or surrounding the subsea equipment 16, between the pull-in location 22 and the subsea equipment 16.

An embodiment of the method illustrated in FIG. 1 is now described.

Firstly, the method comprises hooking up the pull down wire 24. The pull down wire 24 is passed from the winch at the surface (not shown) down to the subsea structure 18 and passed through the pulley 21 of the strong point 20. The end of the pull down wire 24 is then brought back up the surface and attached to the tie-in head 25 of the pipeline 19 when the pipeline 19 is at the surface. The pull down wire is attached to the pipeline 19 by way of the bracket 26 described above. The pig launch receiver 31 is also attached to the tie-in head 25.

Lay away of the pipeline 19 is then initiated by pulling the tie-in head 25 downwards toward the subsea structure 18.

This is achieved by applying a constant tension to the pull down wire 24 using the winch at the surface (not shown).

During lay away the pipeline 19 may be treated/modified so that it can handle thermal expansion, as has been discussed above.

The pipeline 19 is pulled downwards until the pipeline 19 is at the correct location/distance relative to the strong point (state (i) of FIG. 1A). At this location/distance, the latch mechanism 32 attached to pull down wire 24 contacts the strong point 20 and hence sends a signal to stop pull down using the winch.

Once the pipeline 19 is at the correct distance from the strong point 20 (state (i)), lay down can continue until the pipeline is resting in the support cradle 30 in the elevated position (state (ii) of FIG. 1A).

Lay down is then continued until the pipeline 19 also rests against the pipeline support 28. This leaves the pipeline 19 at rest with minimal (or preferably no) bending moment for the pull-in process.

The tie-in end 25 is locked into the support cradle 30.

The pig launch receiver 31 is used to actuate the pig and hence flood the pipeline 19 with water. The pig launch receiver 31 is then removed, as shown by the arrow in FIG. 1A.

The cradle support 30 is then lowered to its lowered position (state (iii) of FIG. 1A), thus lowering the tie-in head 25 to be adjacent the pull-in point 22.

The pipeline 19 is then pulled into the pull-in point 22 to attach the pipeline 19 to the subsea structure 18. This is achieved using a stroking cylinder (not shown).

The pipeline 19 is then locked in position, using a hydraulic clamp (not shown).

As noted above, there are some benefits from the proposed tie-in method even if a direct tie-in is not utilised. The pipeline could be coupled to the subsea equipment via a tie-in spool if needed. However it is preferred to use a direct-tie in so as to avoid the cost of a tie-in spool and in order to minimise the intervention required at the subsea location. With the use of a direct tie-in it is necessary to allow for thermal expansion of the pipeline after installation as well as for movement of the pipe during installation in some circumstances. Various techniques for direct tie-in with specific features for allowing for expansion of the pipe and so on are available. A preferred embodiment makes use of a local residual curvature of the type described in WO 2015/149843, which involves creating a radius of curvature using a technique as described in WO 02/057674.

In operation, a pipeline will expand under the high pressures and temperatures that can be associated with the transport of, for example, oil or gas. In the case of a generally straight configuration between, for example, two subsea structures that are fixed on the seabed, such thermal expansion (which will result in an increased pipeline length) will result in compressive forces on the pipeline. These compressive forces may be significant and, in the absence of some control mechanism, can cause the pipeline to buckle at unpredictable locations, resulting in the deformation and possible collapse of the pipeline in the horizontal or vertical plane.

In conventional installation methods the pipeline is placed under tension as it is deployed from the laying vessel, due to both the weight of the pipe itself and the forward motion of the laying vessel. This tensile force results in an axial elastic extension in the pipeline, and because the pipeline does not regain its original length before the installation process is complete, the installed pipeline remains under tension. This pre-existing tension in the pipeline mitigates the effects of the longitudinal expansion in the operational pipeline; however, the resulting compression forces may still be large enough to cause buckling. Further measures that are commonly used to protect against the buckling of a pipeline include burying the pipeline in a trench or placing it in an open trench, covering the pipeline with gravel, laying the pipeline along a snaked route, laying the pipeline in a larger casing, and including expansion loops in the pipeline along its length. These methods may be expensive, and may leave uncertainty regarding the likelihood and possible location of buckling in the pipeline.

Figure 5:
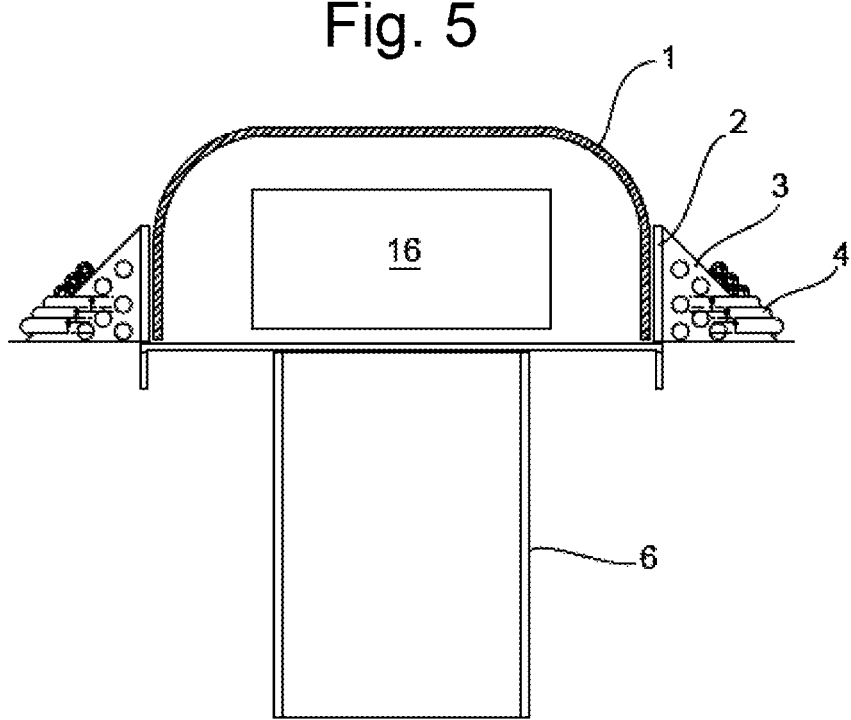

WO 02/057674 describes a method that aims to mitigate these problems by laying a pipeline on the sea bed whilst allowing for controlled thermal expansion using thermal expansion loops. This method is illustrated in FIG. 5 which shows a laying vessel and associated laying apparatus. A similar procedure, or any other suitable process, can be used to plastically deform the pipeline 19 before it is laid down. The procedure of WO 02/057674 involves feeding out the pipeline having a radius of initial residual curvature RrInit from a pipeline reel, preferably via a stinger, to a curvature means where a radius of reverse curvature Rmk is applied to the opposite side of the pipeline with respect to the radius of initial residual curvature RrInit. The curvature means straightens out the pipeline to longer, mainly straight portions having a radius of residual curvature Rr which is larger than some desired minimum radius of residual curvature Rr in. The curvature means exposes shorter portions of the pipeline having a length IE to a radius of counter curvature RmkE which is less than a desired maximum radius of residual curvature REMax. These short lengths with decreased radius of curvature RmkE provide thermal expansion loops in the deployed pipeline. The result of this method is that, during thermal expansion, deflection occurs in a controlled manner at the regions of pre-existing curvature.

The method of WO 02/057674 is adapted according to WO 2015/149843 to create a tie-in and thermal expansion loop in the section of the pipeline adjacent to the tie-in end of the pipeline.

In this adapted process for deploying the pipeline, which may be utilised for the pipeline 19 to create a similar tie-in and thermal expansion loop, the pipeline is deployed from a pipeline reel, which can be on a pipe laying vessel. The pipeline 19 is bent over a stinger as it is deployed from the pipeline reel. There is residual radius of curvature that would result from the storage of the pipeline on the pipeline reel and its bending over the stinger. For the majority of the pipeline 19 this residual curvature is removed via a curvature corrector, which can be a roller device that passes the pipe through a curved path. In a section of the pipeline adjacent to the end of the pipeline that will tie-in to the subsea installation, the curvature corrector is adjusted so that a smaller amount of curvature is applied to the opposite side of the pipeline (i.e. the side that shows convex curvature after deployment from the reel and bending over the stinger). As in WO 02/057674 or WO 2015/149843 this can be done by adjusting the distance between the rollers that set the dimensions of the curved path. In this way, less of the residual curvature produced by the storage on the reel and the bending over the stinger is removed, leaving a radius of curvature in the section of the pipeline section adjacent to the end of the pipeline that is smaller than a predetermined maximum radius of curvature. This creates a tie-in and thermal expansion loop, at the tie-in end of the pipeline.

The radius of curvature of the tie-in and thermal expansion loop may be larger than an elastic radius of curvature of the pipeline 19, meaning that the loop is able to operate as a resilient spring. As a result, any tensile force exerted on the pipeline 19 during the tie-in process causes the tie-in loop to be straightened out. Of course, were the pipeline 19 to be released from the subsea structure, the loop in the pipeline 19 would spring back and adopt its original shape.

As a result of the direct tie-in and thermal expansion loops in the region of the tie-in ends of the pipeline 19, the forces required to pull the pipelines into contact with the respective connectors are greatly reduced. More particularly, the force required to elastically deform the direct tie-in and thermal expansion loop, and thereby stretch the pipeline 19, is significantly less than the force that would be required to either plastically bend a pipeline 19 into the correct alignment or tension a straight pipeline 19 to increase its length.

A further advantage of providing a direct tie-in and thermal expansion loop in the region of the tie-in end of a pipeline is that this loop also compensates for thermal expansion during use of the pipeline. This is as described in WO02/057674. It may be possible to avoid the need for further expansion loops at midway positions along the pipeline 19 as a result of the use of residual curvature as described above.

FIGS. 2 to 7 show subsea installations with which the proposed tie-in method can be used. The tie-in method can be combined with the use of plastic deformation to generate residual curvature as described above. It will be appreciated that the subsea installation of FIG. 1 is broadly similar to all of the foundation and cap/sleeve structures of FIGS. 2-7, and the tie-in method can hence be used in a similar fashion. The tie-in method is also described in further detail below with reference to FIGS. 8-10 in an example relating to a subsea installation as in FIG. 1, i.e. similar to that of FIGS. 2 to 7, and also with reference to FIGS. 11-13 in an example relating to a different type of subsea installation. It will be appreciated that the direct tie-in method can be used with any foundation and any subsea installation provided that the foundation 6/the structure(s) on the foundation 6 provide the necessary locations for the strong point 20 and the pull-in point 22, with a space available between those points for laydown of the pull down wire 24.

Figure 2:
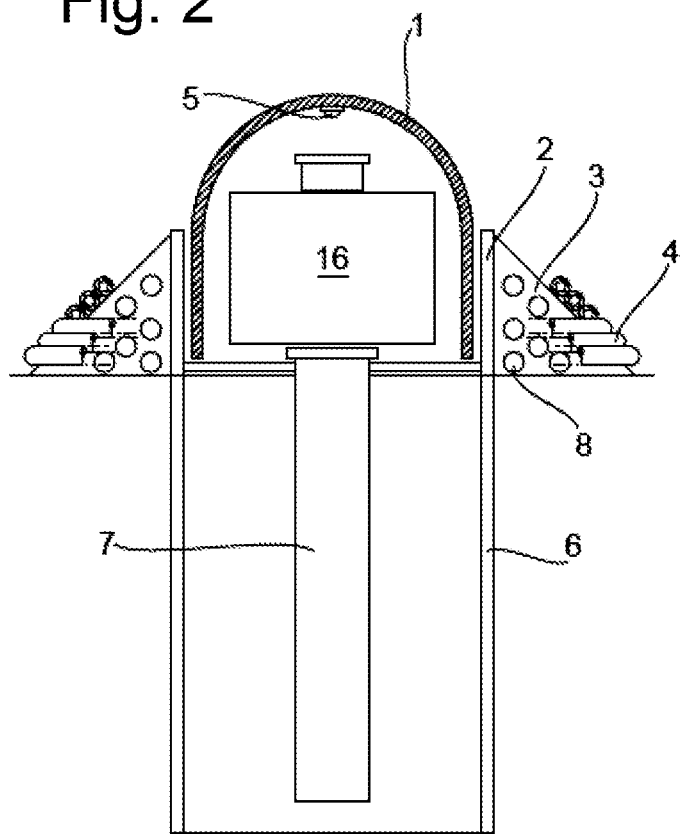
FIG. 2 is a side cross-section of a subsea equipment-protection apparatus with a cap and sleeve arrangement.

FIG. 2 shows a subsea equipment-protection apparatus with a cap and sleeve arrangement. It is shown in side cross-section. The protection concept is based on a pipe in pipe philosophy where a "dome/cup" protection cap 1 fits within a circumferential sleeve 2. In plan view the cap 1 and sleeve 2 are circular in this example. The cap 1 is restrained from movement in a horizontal direction, and is prevented from rotating/pivoting, by the sleeve 2. The cap 1 is secured in place by its weight and by the corresponding shape of the cap and sleeve. This means that no locking device is required in order to fit the cap 1 to protect the subsea equipment 16 from lateral trawl loads and downwards vertical impact loads. This apparatus can be used with a direct tie-in pipeline connection method as proposed herein, since with the cap 1 removed and a suitable arrangement of the subsea equipment 16 on the foundation 6 the required access across the width of the foundation 6 for use of the proposed strong point 30

Figure 4:
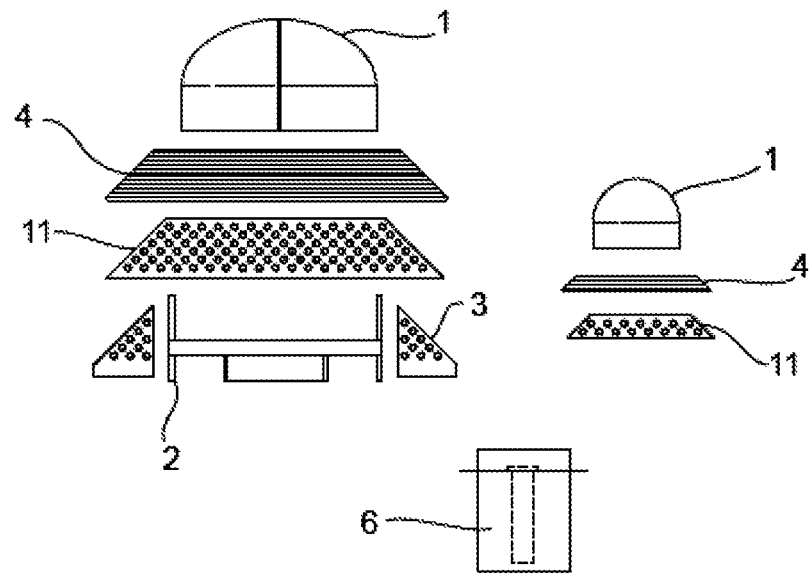
FIG. 4 is an exploded view of a subsea equipment-protection apparatus with a cap and a sleeve.
Figure 6:
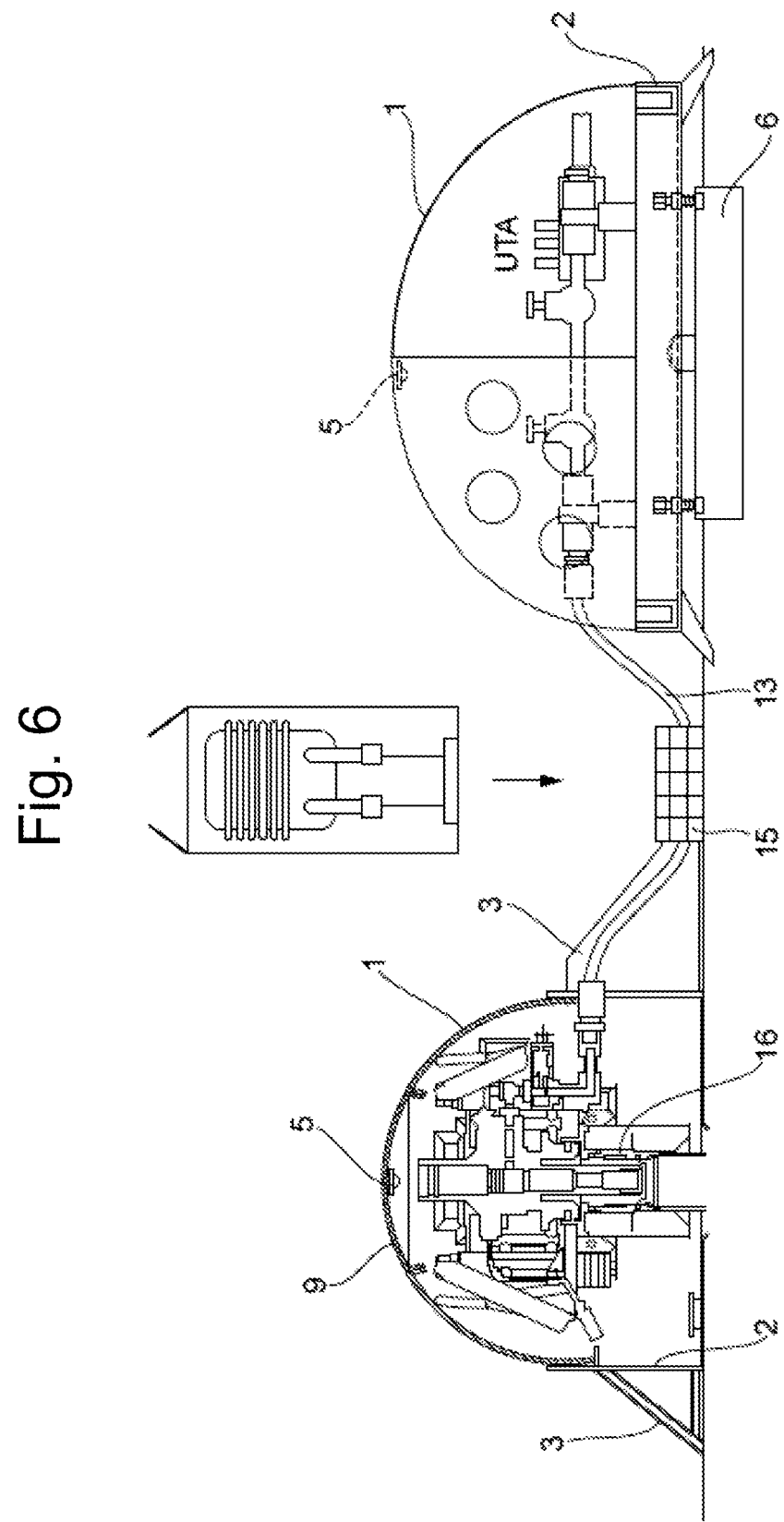
FIG. 6 shows a subsea equipment-protection apparatus for a Christmas tree together with a subsea equipment-protection apparatus for a manifold.

The protection concept can be used on a single suction pile 6 for protection of a Christmas tree (XT), as shown, or for protecting other structures (manifold, UTA, pumps etc.) where a sleeve ring can be integrated to the foundation support. FIGS. 4 to 6 show other subsea equipment as well as XT. The protection cap 1 can be in one unit or several segments locked in place when fitted inside the sleeve ring 2. The sleeve ring 2 accommodates trawl deflectors 3. In the example of FIG. 1 the trawl deflectors 3 take the form of triangular panels fitted to the side walls of the sleeve 2, these may be mounted about the circumference of the sleeve 2, for example at 90 degree intervals. The trawl deflectors 3 can have holes 8 for reducing their weight and minimising the forces generated by ocean currents. The trawl deflectors may support a flexible flowline 4 during installation. This provides a convenient way to hold the flow line 4 and to transport it to the sea-bed.

FIG. 2 also shows the use of a sensor 5 for detecting build-up of gas or pressure leakage from the subsea equipment 16 or from any other source. The Figure further illustrates the way that a pipeline 7 can be drilled through the suction pile foundation 6.

Figure 3:
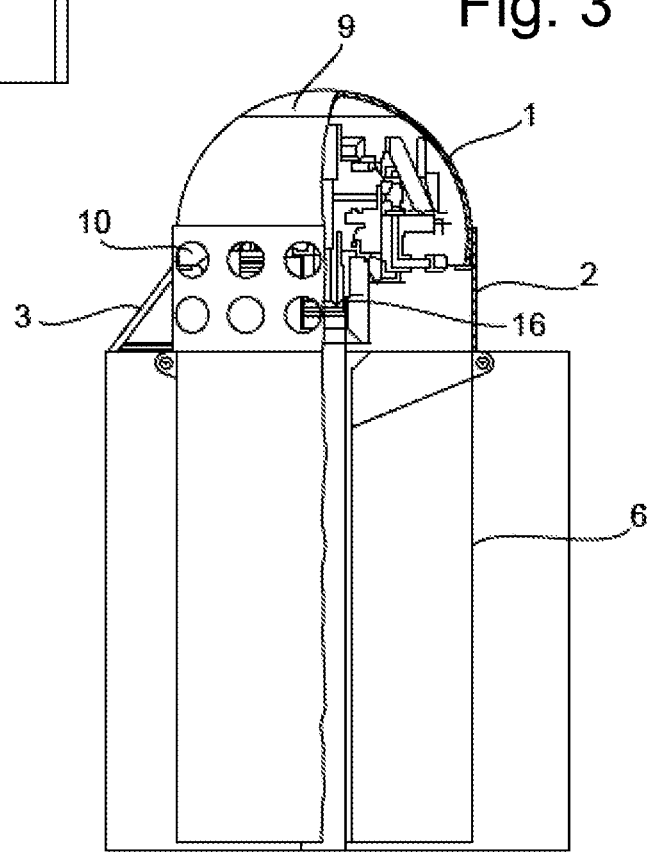
FIG. 3 shows a similar subsea equipment-protection apparatus to that of FIG. 2 in partial section view.

Another example is shown in FIG. 3. This has the same basic features as the example of FIG. 2, with a cap 1, sleeve 2, trawl deflector 3 and foundation 6. In this example the trawl deflector 3 uses an angled beam rather than a triangular plate. This Figure also illustrates additional optional features, including an access hatch 9 in the upper part of the cap 1 and holes 10 in the sleeve 2. The holes 10 in the sleeve can be used to allow access to the subsea equipment 16. The hatch 9 has a similar purpose. FIG. 3, as compared with FIG. 2, also shows how the cap 1 can be supported by an upper part of the sleeve ring (in FIG. 3) or by sitting at the base of the sleeve ring 2 (in FIG. 2).

The basic main elements are shown in two further examples in FIG. 4, in exploded view. On the left of the Figure a protection apparatus for a manifold or similar structure is shown. The cap 1 is non-circular in plan view in order to accommodate the rectangular shape of a manifold. The sleeve 2 has a similar shape to the cap 1. The cap 1 fits into the sleeve 2 and the sleeve 2 has trawl protectors 3. On the right of FIG. 4 an XT protection apparatus for XT is shown. In both cases, a flexible flow line 4 can be wrapped around the sleeve 2 as discussed above. A further feature shown in FIG. 4 is a frustoconical element 11 for trawl deflection. Thus, with these examples the trawl deflector can be made up of the angle plate 3 and the frustoconical element 11. Of course, with the manifold protection apparatus the frustoconical element 11 is not a true cone since it must also follow the non-circular shape of the cap 1.

FIG. 5 shows another example protection apparatus, similar to that on the left of FIG. 4. The subsea equipment 16 may be a manifold. The apparatus of FIG. 5 is similar in form to that of FIG. 2 aside from that the shape in plan view would be non-circular, for example a stadium shape or an oval, so that it fits closely around generally rectangular subsea equipment 16.

Figure 7:
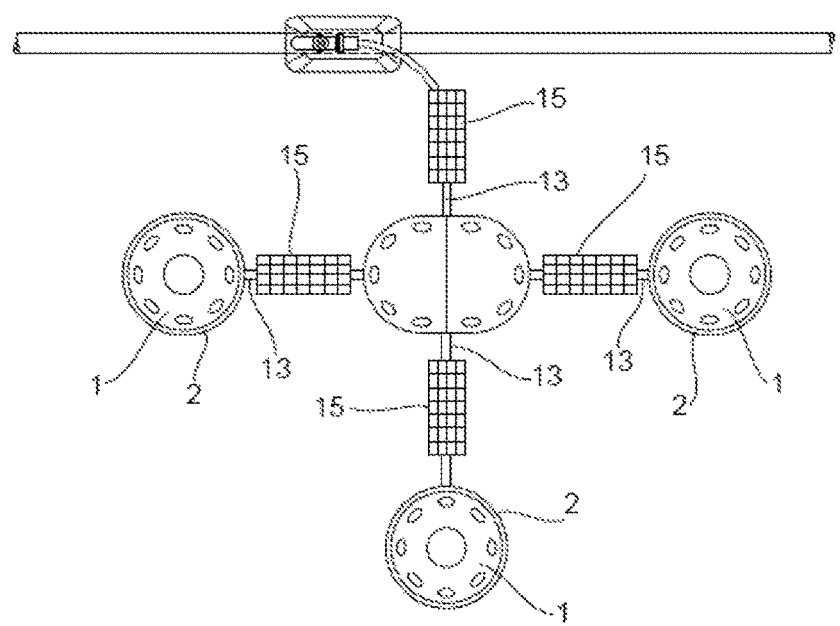
FIG. 7 is a plan view of a layout of a subsea installation.

The cap and sleeve protection apparatus can be used in a subsea installation to protect various different parts of subsea equipment, as shown in FIG. 6 and FIG. 7.

In FIG. 6 a CAN and XT on the left are protected by a first cap 1 and sleeve 2 arrangement, which would be generally circular in plan view, and a manifold on the right is protected by a second cap 1 and sleeve 2 arrangement, which would be non-circular in plan view. The XT protection apparatus is shown in side cross-section. The manifold protection apparatus is shown in partial side cross-section. In FIG. 7 a subsea installation is shown in plan view. Three Christmas trees with circular caps 1 are connected to a manifold with a stadium shaped cap 1.

The subsea equipment is connected together by line 13, which can be protected by a concrete mattress 15. The line(s) 13 may be a pipeline 19 attached to the subsea equipment 16 using the present method and system. Since the various elements of subsea equipment 16 are separated apart and have separate protection then they can be placed freely wherever is most convenient, and also it is possible to easily remove and add elements in a modular fashion. Intervening elements could also be easily added later on, for example a booster pump 17 as shown in FIG. 6. This type of flexible approach is not possible with prior art shielding structures where multiple pieces of equipment are combined together under one large shield.

Figure 8:
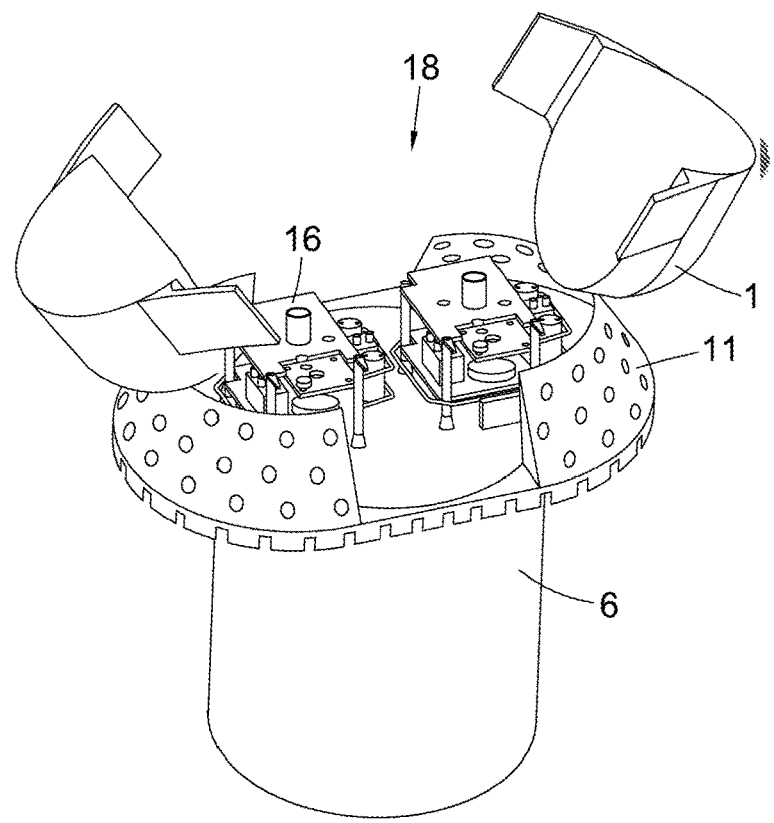
FIG. 8 is a perspective view of a subsea structure adapted for use with the method of FIG. 1.
Figure 9:
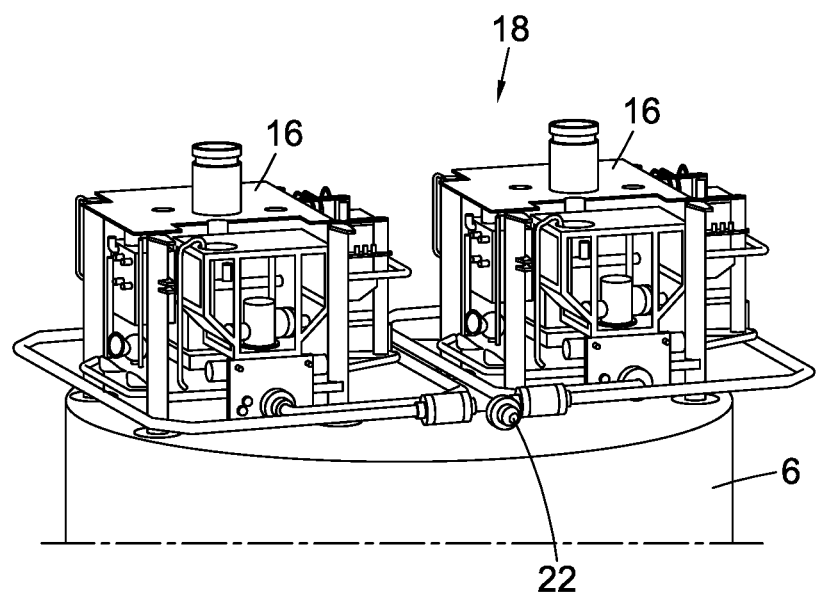
FIG. 9 shows the subsea structure of FIG. 8 with cap and trawl deflectors removed and including pipework for connection to the pipeline.
Figure 10:
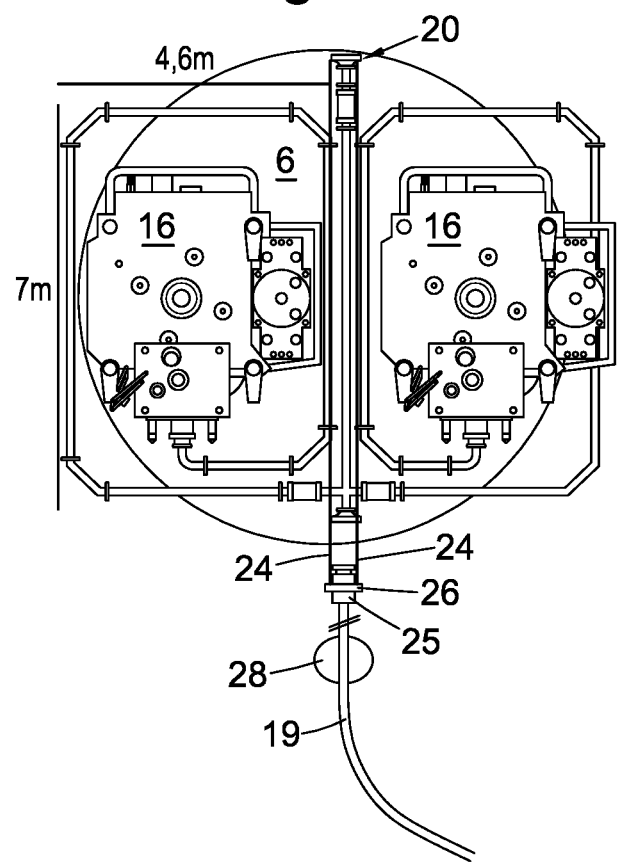
FIG. 10 is a plan view showing the same features as FIG. 9 along with the pipeline during pull-down and/or lay away.

The tie-in method discussed above with reference to FIG. 1 can be used with the subsea installation of FIGS. 2 to 7. FIGS. 8 to 10 show an example of this.

FIG. 8 shows an exemplary subsea structure 18 adapted for use with the method of FIG. 1. The subsea structure comprises the support, in the form of the suction foundation 6, which supports the subsea equipment 16, the pull-in point 22 and the strong point 20. The subsea equipment is protected by the cap 1 and the trawl deflector 11. The cap 1 is removable so as to allow for access to the straight clear path between the strong point 20 and the pull-in point 22. The trawl deflector 11 may comprise one or more gaps to allow for access to the straight clear path.

FIG. 9 shows the subsea structure of FIG. 8 with cap 1 and trawl deflectors 11 removed and including pipework for connection to the pipeline 19.

FIG. 10 shows a plan view showing the subsea structure 18 of FIGS. 8 and 9, again with the cap 1 and the trawl deflectors 11 removed. However, FIG. 10 also shows the pipeline 19 during pull down. As can be seen by the curvature of the pipeline 19 in FIG. 10, the pipeline 19 has been modified so that it is curved for thermal expansion control.

FIG. 11 shows an alternative embodiment of the system 117 for use with the present method. This system 117 can also be used in combination with the subsea installation of FIGS. 2 to 7. FIG. 12 shows a detail of FIG. 11 in enlarged view. FIG. 13 is a side view showing the same structure as FIG. 11, and illustrating a method of its use. This is similar to FIG. 1. However, in FIG. 13 only states (ii) and (iii) are shown; state (i) is not shown but would be present before state (ii).

The system 117 is substantially identical to the system 17 of FIG. 1, except where stated below.

FIG. 13 is a side view showing the same structure as FIG. 11, and illustrating the method of its use. This is similar to Figure and indicating the location for the pipeline when installed as well as the location for insertion of a pig via the pig launcher receiver.

The system 117 comprises a plurality of foundations 106. A supporting structure 107 is mounted to these foundations 106. The support structure 107 is a framework having its footings at the foundations 106. The framework 107 is arranged to the hold subsea equipment 116 along with the strong point 120 and the pull-in points 122, 122', with the clear path again extending in between subsea equipment 116.

There are a plurality of pull-in points 122, 122', some of which 122 are located on a first side of the support structure 107 and some 122' that are located on a second opposite side of the support structure 107. Although not shown, the strong point 120 could be located toward the centre of the support structure 107 so that it can be used to install pipelines 119 into both pull-in points 122, 122'.

The support structure 107 supports the trawl deflector 11, which again comprises a gap to allow access to the clear straight path.

The pulley 121 of the strong point is raised above the support 107 by a height that is substantially equal to the height of the pipeline 119 when it is resting in the elevated position of the cradle support 130. Thus the pull-down wire 124 extends horizontally between the pipeline 119 and the pulley 121 when the pipeline is supported by the cradle support 130 in the elevated position.

The support 107 is a polygonal structure, in the general form of a rectangle. The straight clear path crosses from one side of the rectangle to the other, and substantially bisects the rectangle along the longer of the edges of the rectangle.

The invention claimed is:

1. A method for installing a subsea pipeline at a subsea structure, wherein the subsea structure includes a support in the form of a foundation or a supporting structure mounted to a foundation and being for transferring loads to the foundation, the method including:

providing the support with a pull-in point at a proximal location relative to the subsea pipeline, wherein the proximal location is at a first side of the support, and wherein the pull-in point is where the pipeline is to be connected to the subsea structure;

providing the support with a strong point at a distal location relative to the subsea pipeline, wherein the distal location is spaced apart from the proximal location and there is a straight clear path between the pull-in point and the strong point for lay down of a pull down wire, this clear path bridging some of or all of a width of the support, wherein the strong point is a structure for withholding forces applied to the support via the pull down wire as a tie-in head of the pipeline is pulled down;

passing the pull down wire through a guide at the strong point and using the pull down wire to pull down the pipeline, wherein the length of the clear path is known, and the method comprises ceasing to pull down the pipeline when the pipeline is at the correct distance relative to the strong point, the correct distance being equal to, or slightly greater than, the distance between the strong point and the pull-in point;

then laying down the pipeline and passing the pull down wire along the clear path; and continuing the laying down and/or pulling in until the tie-in head of the pipeline is at a required location at the pull-in point.

2. The method as claimed in claim 1, wherein no initiation foundation or initiation pile is used.

3. The method as claimed in claim 1, wherein the foundation is a suction pile.

4. The method as claimed in claim 1, wherein multiple foundations are used.

5. The method as claimed in claim 1, wherein the support holds subsea equipment with the clear path laying in between subsea equipment.

6. The method as claimed in claim 1, comprising hooking up the pull down wire from a tensioning system at the sea surface, through the strong point and to the pipeline.

7. The method as claimed in claim 1, wherein a plurality of pull down wires are used.

8. The method as claimed in claim 1, wherein after lay down the pull down wire is used to pull the pipeline into the pull-in point.

9. The method as claimed in claim 1, wherein the lay down of the pipeline is performed until the pipeline comes to rest on a pipeline support.

10. The method as claimed in claim 1, wherein the lay down of the pipeline is performed until the pipeline comes to rest on a cradle support in an elevated position.

11. The method as claimed in claim 10, further comprising locking the pipeline to the cradle support.

12. The method as claimed in claim 1, further comprising flooding the pipeline using a pig actuated by a pig launch receiver, after lay down of the pipeline.

13. The method as claimed in claim 10, further comprising lowering the cradle support to a lowered position adjacent the pull-in point.

14. The method as claimed in claim 13, further comprising pulling in the pipeline into the pull-in point to connect the pipeline to the subsea structure.

15. The method as claimed in claim 1, further comprising, during introduction of the pipeline into the sea from a pipe laying vessel, applying a plastic deformation to a region of the pipeline at or close to an end of the pipeline to be tied-in and, either during or following tie-in, elastically deforming said region to increase its radius of curvature.

16. The method as claimed in claim 15, wherein said region is located within 200 m, and more preferably 100 m, of the tie-in end of the pipeline.

17. The method as claimed in claim 15, further comprising pulling the pipeline into the pull-in point after lay down of the pipeline, wherein said action of pulling results in the elastic deformation of said region.

18. The method as claimed in claim 1, wherein the distal location is at a side of the support opposite the first side.

19. The method as claimed in claim 1, wherein the distal location is toward the center of the support.

20. The method as claimed in claim 1, wherein a heater is attached or adjacent to the pipeline.

21. A system for installing a subsea pipeline at a subsea structure,
wherein the subsea structure comprises a support as part of the subsea structure, the support being in the form of a foundation or a supporting structure mounted to a foundation and being for transferring loads to the foundation;
wherein the support comprises a pull-in point at a proximal location relative to the subsea pipeline, wherein the proximal location is at a first side of the support, and wherein the pull-in point is where the pipeline is to be connected to the subsea structure;
wherein the support comprises a strong point or a mount for a strong point to which a strong point is connected at a distal location relative to the subsea pipeline, wherein the distal location is spaced apart from the proximal location and there is a straight clear path between the pull-in point and the strong point for lay down of a pull down wire, this clear path bridging some of or all of a width of the support, and wherein the strong point is a structure for withholding forces applied to the support via the pull down wire as a tie-in head of the pipeline is pulled down;
wherein the strong point comprises a guide, the guide being configured such that the pull down wire may pass therethrough and such that the guide may be used in conjunction with the pull down wire and the straight clear path to pull down, then lay down and pull in the pipeline toward the pull-in point; and
wherein the system comprises an automated system for indicating when the pull down wire has reached a correct location/distance relative to the strong point, the correct location/distance being equal to, or slightly greater than, the distance between the strong point and the pull-in point so that pull down of the pipeline can be ceased and then laying down of the pipeline and passing the pull down wire along the clear path can be performed.

22. The system as claimed in claim 21, wherein the system is configured to perform a method for installing the subsea pipeline at the subsea structure, the method including:
providing the support with the pull-in point at the proximal location;
providing the support with the strong point at the distal location;
passing the pull down wire through a guide at the strong point and using the pull down wire to pull down the pipeline, wherein the length of the clear path is known, and the method comprises ceasing to pull down the pipeline when the pipeline is at the correct distance relative to the strong point, the correct distance being equal to, or slightly greater than, the distance between the strong point and pull-in point;
then laying down the pipeline and passing the pull down wire along the clear path; and
continuing the laying down and/or pulling in until a tie-in head of the pipeline is at a required location at the pull-in point.

23. The system as claimed in claim 21, wherein the subsea structure comprises subsea equipment supported by the support of the subsea structure; and a subsea equipment-protection apparatus comprising: a cap and a sleeve, wherein the cap and the sleeve are configured to be supportable by the foundation of the subsea structure; and the cap and the sleeve are arranged such that at least a portion of the cap may enter an opening of the sleeve and be supported by the sleeve; the cap and sleeve thereby covering and protecting the subsea equipment.

24. The system as claimed in claim 23, wherein the sleeve is mounted to the foundation and surrounds the subsea equipment, and wherein the cap covers the subsea equipment.

25. The system as claimed in claim 21, comprising a plurality of the subsea structures, wherein the subsea structures are connected in a satellite arrangement.

26. The system as claimed in claim 25, wherein the pieces of subsea equipment are connected to one another via one or more pipeline(s) on the seabed.

27. A method of installation of the subsea equipment-protection apparatus of the system of claim 23, the method comprising: mounting the sleeve to the foundation of the subsea equipment; locating the cap at the opening of the sleeve, and inserting the at least a portion of the cap into the opening of the sleeve so that the cap is retained within the sleeve.

28. A method of installation of the system of claim 26, comprising installing each of the one or more pipeline(s) by:
providing the support with the pull-in point at the proximal location;
providing the support with the strong point at the distal location;
passing the pull down wire through the guide at the strong point and using the pull down wire to pull down the pipeline, wherein the length of the clear path is known;
ceasing to pull down the pipeline when the pipeline is at the correct distance relative to the strong point, the correct distance being equal to, or slightly greater than, the distance between the strong point and pull-in point;
laying down the pipeline and passing the pull down wire along the clear path; and
continuing the laying down and/or pulling in until a tie-in head of the pipeline is at a required location at the pull-in point.

* * * * *